US008534468B2

(12) United States Patent
Winkler et al.

(10) Patent No.: US 8,534,468 B2
(45) Date of Patent: Sep. 17, 2013

(54) SCREEN BASKET OPTIMIZED FOR REMOVAL OF STICKIES FROM ADHESIVES-CONTAMINATED RECYCLABLE FIBER

(75) Inventors: Wayne F. Winkler, De Pere, WI (US); Bradley E. Lucas, Menasha, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 51 days.

(21) Appl. No.: 13/348,692

(22) Filed: Jan. 12, 2012

(65) Prior Publication Data

US 2012/0181237 A1 Jul. 19, 2012

Related U.S. Application Data

(60) Provisional application No. 61/461,117, filed on Jan. 13, 2011.

(51) Int. Cl.
| | |
|---|---|
| *B01D 39/10* | (2006.01) |
| *B01D 29/00* | (2006.01) |
| *D21D 5/02* | (2006.01) |
| *D21D 5/16* | (2006.01) |
| *D21H 17/01* | (2006.01) |

(52) U.S. Cl.
USPC .......... 210/499; 210/415; 209/305; 209/273; 209/393; 162/251; 162/55

(58) Field of Classification Search
None
See application file for complete search history.

(56) References Cited

U.S. PATENT DOCUMENTS

| 845,224 | A | 2/1907 | Eibel |
| 4,155,841 | A | 5/1979 | Chupka et al. |
| 4,383,918 | A | 5/1983 | Chupka et al. |
| 5,575,395 | A | 11/1996 | Alajaaski et al. |
| 5,791,495 | A | 8/1998 | Gero et al. |
| 6,338,412 | B1 | 1/2002 | Serres et al. |
| 6,491,168 | B1* | 12/2002 | Lutz et al. ..................... 210/402 |
| 6,595,373 | B1 | 7/2003 | Seifert |
| 6,789,681 | B2 | 9/2004 | Czerwoniak et al. |
| RE38,738 | E | 5/2005 | Serres et al. |
| 7,674,355 | B2 | 3/2010 | Doshi et al. |
| 2003/0094401 | A1 | 5/2003 | Bergdahl et al. |
| 2012/0181237 | A1* | 7/2012 | Winkler et al. ............... 210/773 |

FOREIGN PATENT DOCUMENTS

| WO | 00/65151 A1 | 11/2000 |
| WO | WO 2012/097202 A2 * | 7/2012 |

OTHER PUBLICATIONS

International Search Report and Written Opinion of the International Searching Authority for PCT/US2012/021161 dated Aug. 29, 2012.

* cited by examiner

*Primary Examiner* — Robert James Popovics
(74) *Attorney, Agent, or Firm* — Laura L. Bozek

(57) ABSTRACT

A screen structure which is unusually effective at removing stickies from recyclable fiber but is tolerant of substantial swings in throughput which result in variations in the flow velocity through the screen-slot velocity. One example of the screen structure is created by forming a very large number of similarly shaped vanes then locking them into a ring structure to form a cylindrical screen basket but equivalent surface configurations can also be formed into sheet stock.

14 Claims, 24 Drawing Sheets

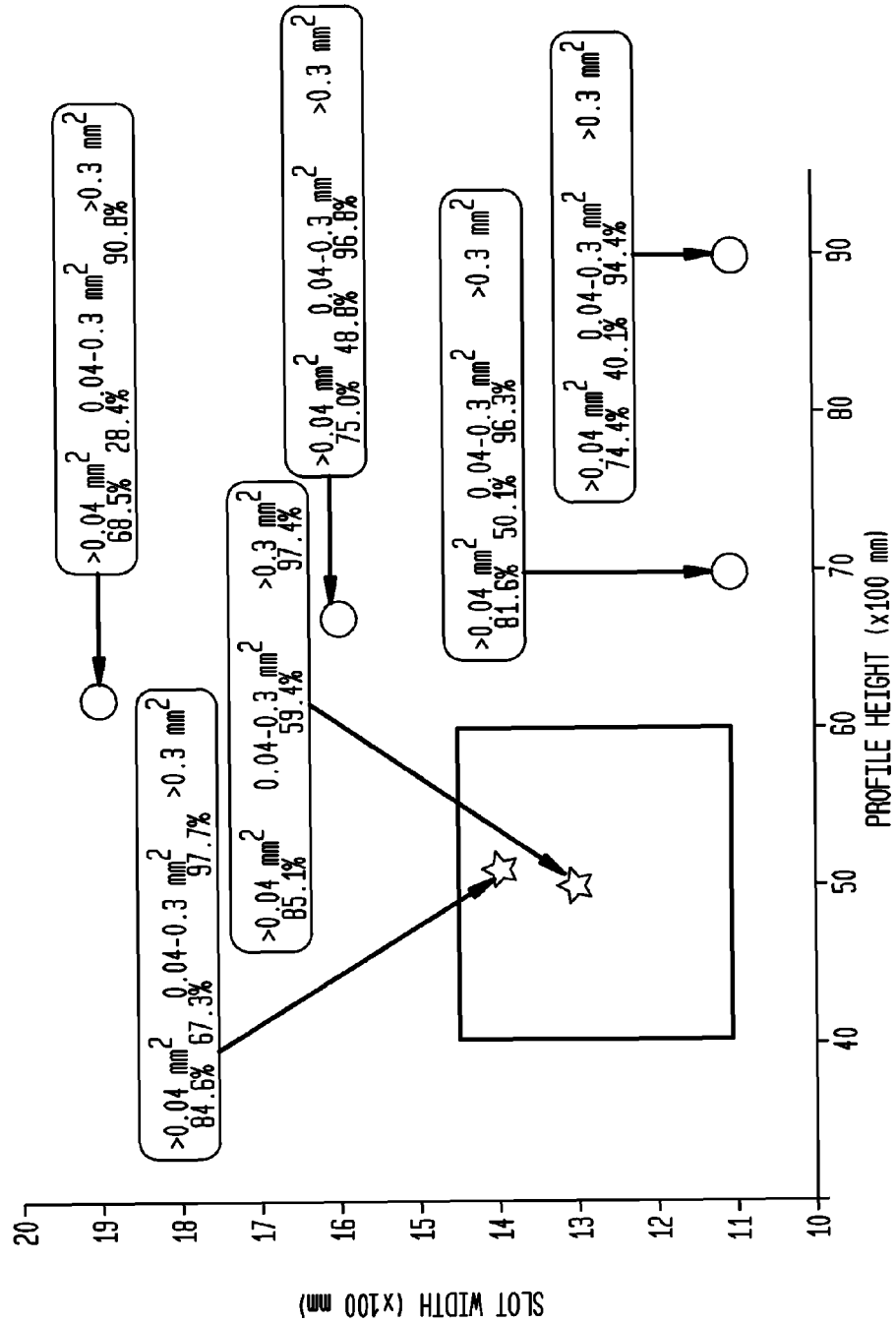

SCREEN BASKET OPTIMIZED FOR REMOVAL OF STICKIES FROM ADHESIVES-CONTAMINATED RECYCLABLE FIBER

CLAIM FOR PRIORITY

This non-provisional application is based upon U.S. Provisional Patent Application No. 61/461,117, of the same title, filed Jan. 13, 2011. The priority of U.S. Provisional Patent Application No. 61/461,117 is hereby claimed and the disclosure thereof is incorporated into this application by reference.

TECHNICAL FIELD

Recycling is fast becoming essential for almost every recyclable commodity, yet differences between prices for commodities obtained from nature and those obtained from waste often do not economically justify use of recyclable materials. In the case of fiber obtained from recycle streams of waste paper, it is often quite difficult to render the fiber equivalent in quality to fiber obtained from virgin pulp without incurring costs exceeding the price differential between virgin fiber and the recyclable fiber contained in readily available waste streams.

BACKGROUND

Achieving virgin equivalent quality from recycled paper is increasingly difficult as fiber from lower and lower grade sources is used. Curbside recycled paper is usually considered just about the lowest possible grade of paper being recycled today. One factor which seems to contribute to the difficulty of obtaining fiber having quality equivalent to virgin fiber from curbside recycled paper is the presence of large amounts of "stickies" and other contaminants in the paper; but industrial/commercial waste papers are also becoming increasingly contaminated, especially with troublesome adhesives. Stickies commonly result from pressure sensitive labels in the waste paper but can be created by other adhesives, plastic window envelopes and the like. During the papermaking process, stickies in the furnish cause problems both by precipitating out of the furnish onto machine parts as well as by remaining in the web where they contribute to dense spots of adhesive, ink, plastic, fiber and a host of other contaminants. Stickies are especially problematic when recycle fiber is being used for tissue products as, in bath and facial tissue, each ply of tissue may only have a thickness equivalent to perhaps seven to ten layers of fiber, so the dark dense spot resulting from a stickie which finds its way into the finished sheet detracts both from the aesthetic appearance of the sheet and its functional integrity. Stickies that deposit out on machine clothing interfere with the proper movement of water and/or air through the fabric, again potentially contributing to defects in the finished product.

As waste paper is converted into pulp which is usable in making tissue and towel products, it is subjected to many of the same processes used with virgin pulp. In fact many mills will use a combination of virgin and recycle pulp to "dial-in" quality. This can lead to difficulties in fiber processing as many of these procedures are relatively sensitive to throughput variations. An especially important process is "screening" in which pulp is fed through a "screen" to remove dirt and other contaminants. Virtually all of the pulp fed to a papermachine will pass through a series of screens, each configured to remove contaminants progressively smaller in size than the screen before. Each screen will typically also have some means for removing contaminants lodged on the screen so that the screen does not become blocked. The term "screen" is often used both to refer to the overall apparatus used for removing impurities from pulp and for the actual perforate structure which forms the heart of that apparatus. In this application, the aggregate of those structures that form the removable perforate structure are typically referred to as the screen basket. This application relates to the perforate screen structure and more particularly to the shape of the surface of the screen structure which contacts the fiber suspension from which impurities are to be removed. Typically, foils moving relative to the screen basket are used for this purpose. These foils are hypothesized to induce negative pressure pulses that clear debris off of the screen basket so that it can pass out of the screen through a reject line.

SUMMARY OF THE INVENTION

This invention relates to a screen structure which is unusually effective at removing stickies from recyclable fiber but is tolerant of substantial swings in throughput which result in variations in the flow velocity through the screen-slot velocity.

In modern screens, a great deal of attention is paid both to the hydrodynamics of the flow system as it passes over the screen structure but also to the stresses imposed on the screen as it is subjected to alternating pressure pulses which temporarily induce backflow through the openings in the screen which ideally remove debris which might otherwise occlude the screen and thereby reduce the screening systems capacity. There are two primary techniques used for constructing screens. In the first, a web structure, typically a sheet of stainless steel, has a variety of inter-cooperating grooves, channels, perforations and slits formed in both of its surfaces. The sheet is then rolled into a cylindrical shape and incorporated into the screen system. In the second, a plurality of vanes are formed, often each vane will have a quite complex shape possibly including tapers, grooves, lands, relieved regions and dressed away areas so that when the vanes are assembled into a cylindrical array, precisely shaped slits are formed through the resulting cylindrical shell formed by the multitude of vanes.

There are advantages to each method of construction; but, in screens formed by either technique, the goal is to precisely form a surface joined to slits in parallel in which the flow of water will efficiently conduct fibers through the slits while rejecting contaminants without occluding the surface of the screen. The present invention is thought to be most easily practiced by forming a very large number of similarly shaped vanes then locking them into a ring structure to form a cylindrical screen basket but equivalent surface configurations can also be formed into sheet stock although the manufacturing cost may be higher due to the difficulties involved in forming precise slits, channels, grooves and contours in the required size.

While large stickies are especially problematic when they find their way into the sheet and the effect of very small stickies in the sheet itself can be difficult to detect, it is not sufficient to remove only the larger stickies at the screens as the adhesives, particularly the pressure sensitive adhesives, tend to aggregate during the papermaking process and grow into larger stickies. Accordingly, one common way of measuring the effectiveness of screening is to separately measure the total area of stickies removed in several size ranges. We prefer to analyze stickies contents in terms of the stickies content by total area in the ranges of 0.001-0.04 mm$^2$, 0.04-0.3 mm$^2$ and over 0.3 mm$^2$. In addition, it is sometimes useful to aggregate the 0.04 to 0.3 mm$^2$ and over 0.3 mm$^2$ ranges into a single category of over 0.04 mm$^2$. Typically, most well designed screens are reasonably effective for stickies over ~0.3 mm$^2$ in area but will have more difficulty with stickies in the two smaller ranges of 0.001-0.04 mm$^2$ and 0.04-0.3 mm$^2$. Further, it is generally thought that there is a tradeoff between designing screens to be effective on the smaller size ranges of stickies and the amount of fiber that can be effectively cleaned by that screen in a given period. We have found that the screens of the present invention have surprising effectiveness with smaller stickies removal coupled with the ability to process large quantities of fiber over a wide range of slot velocities. It is considered quite surprising that these screens could combine the ability to both remove large fractions of the smaller stickies and process large amounts of fiber over a wide range of slot velocities. Effective removal of large stickies is, however, the sine qua non of screen design. A screen design which is not extremely effective in removing large stickies can only be employed in special circumstances.

We have found that surprisingly effective removal of stickies from recyclable waste can be achieved by passing pulp derived from industrial, commercial and post-consumer waste through a metallic screen basket having an accepts contacting surface approximating that of a right circular cylinder having an axis "A", a circumference "C" and a diameter "D", said surface comprising a plurality of sequences of facets, each sequence comprising a generally circumferentially extending facet, an upstream generally diametrally extending facet adjacent thereto, and a downstream generally diametrally extending facet adjacent thereto, each said generally circumferential facet being generally parallel to the axis "A" of the cylinder and having a leading edge and a trailing edge, each said leading edge and trailing edge as well as each said upstream generally diametrally extending facet and each said downstream generally diametrally extending facet being generally parallel to the axis "A" of the cylinder, each said leading edge being located upon a cylindrical surface $S_1$, and each said trailing edge being located upon a cylindrical surface $S_2$, the diametral difference "δ" between the distance from the axis "A" of the cylindrical surface $S_1$ from the diametral distance from the axis "A" of the cylindrical surface $S_2$ being between about 0.4 mm to about 0.6 mm, the normal direction to the surface of each said generally circumferential facet in each sequence of facets having a component directed toward the adjacent trailing edge of an adjacent generally circumferential facet in an adjacent sequence of facets, the angle "α" between the normal to each said generally circumferential facet and the diametral direction of said right circular cylinder being between about 80° and 76°, the distance "t" from the leading edge to the trailing edge of each said generally circumferential facet being between about 2.3 mm and 2.5 mm, the upstream generally diametrally extending facet of each sequence adjoining the leading edge of a generally circumferential facet and the downstream generally diametrally extending facet of each sequence adjoining the trailing edge, the distance between the upstream generally diametrally extending facet of each sequence and the downstream generally diametrally extending facet of the next adjacent sequence "w" being between about 0.11 and 0.14 mm, a relieved channel leading from the accepts side to the rejects side of said screen being defined between the upstream generally diametrally extending facet of each sequence and the downstream generally diametrally extending facet of the next adjacent sequence.

In some embodiments, the screen basket is formed from at least one unitary metallic sheet, usually of stainless steel, each sheet having a plurality of trenches formed into its surfaces and a plurality of slits formed therethrough.

In other embodiments, a corrosion resistant hardened surface is disposed upon said screen basket; preferably said corrosion resistant hardened surface comprises a major proportion of chromium having hardness of at least about 65 on the Rockwell C scale in a thickness of at least 0.2 mils up to about 1.0 mils.

Still yet other features and advantages of the invention will become apparent from the following description and appended Figures.

BRIEF DESCRIPTION OF THE DRAWINGS

The invention is described in detail below with reference to the drawings wherein like numerals designate similar parts and wherein:

FIGS. 20-24 illustrate the performance of a variety of screen designs on various size ranges of stickies as slot velocity is varied.

DETAILED DESCRIPTION

The invention is described below with reference to a preferred embodiment. Such discussion is for purposes of illustration only. Modifications to particular examples within the spirit and scope of the present invention, set forth in the appended claims, will be readily apparent to one of skill in the art.

Terminology used herein is given its ordinary meaning unless otherwise indicated.

Figure 1:
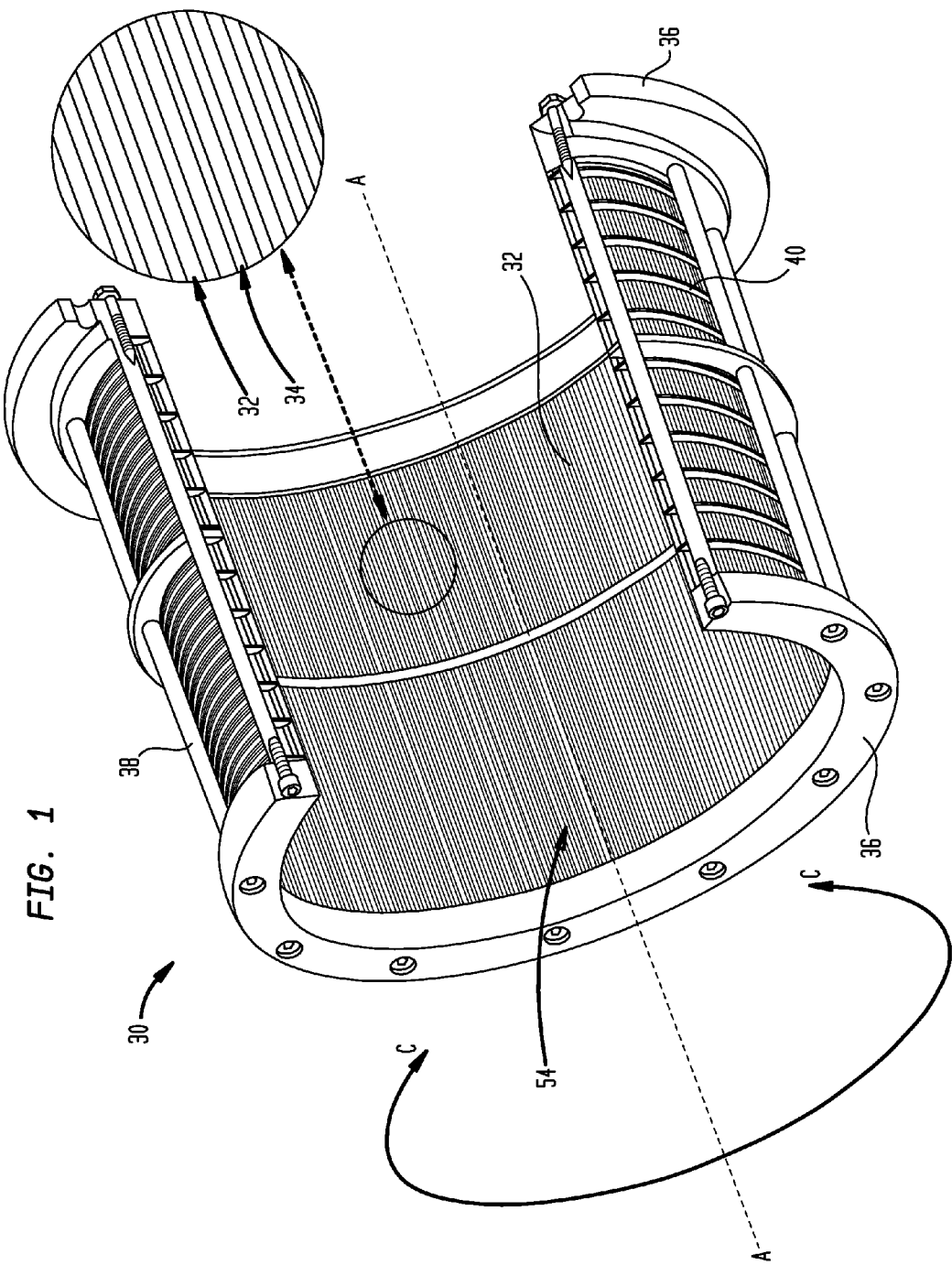
FIG. 1 is a partially cut away perspective of a known construction of a screen basket which is suitable to be adapted for practice of the present invention by replacement of the vanes therein by vanes having the configuration described herein.

FIG. 1 illustrates a screen basket 30 comprised of a very large number of longitudinally extending vanes 32 defining longitudinally extending slits 34 therebetween, vanes 32 being held between flanges 36 joined by longitudinally extending rods 38. Vanes 32 are reinforced by circumferential ribs 40. This overall method of construction is known from U.S. Pat. No. RE 38,738 E and is well suited to receive and retain vanes 32 as described herein.

Figure 2:
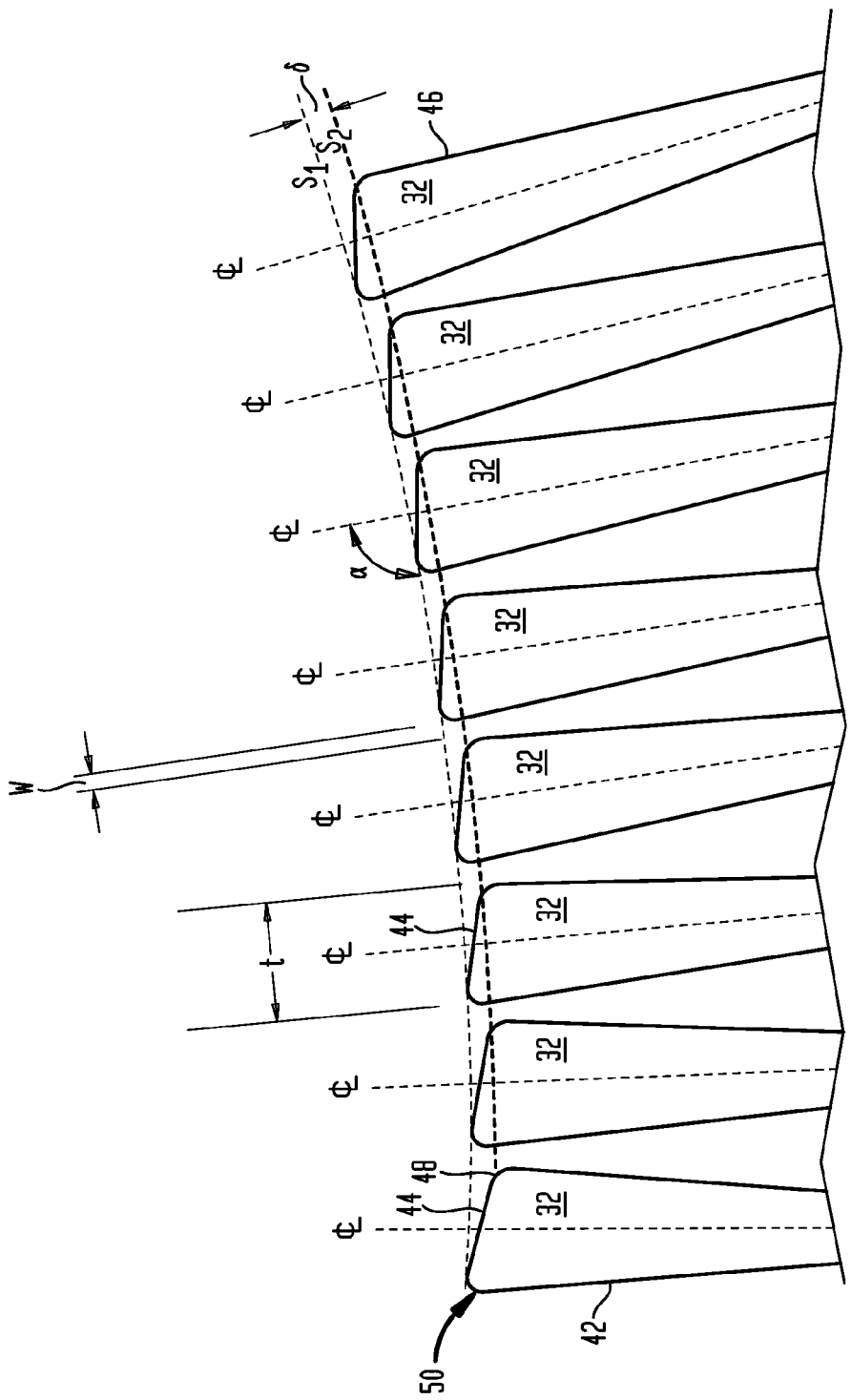
FIG. 2 is a schematic illustration of the geometry of the supply side of a screen basket constructed from a large number of vanes.

FIG. 2 (with periodic reference to FIGS. 1 and 3) illustrates the cross-section of several vanes 32 of the present invention. Each vane 32 has three facets: downstream generally diametrally extending facet 42, generally circumferentially extending facet 44 and upstream generally diametrally extending facet 46. Upstream generally diametrally extending facet 46 adjoins generally circumferentially extending facet 44 at leading edge 48 while downstream generally diametrally extending facet 42 adjoins generally circumferentially extending facet 44 at trailing edge 50 which preferably has a radius of curvature of about 0.6 mm. On each vane 32, centerline ₵ extends toward geometrical axis "A" of screen basket 30. Leading edge 48 of each vane 32 lies upon imaginary cylindrical surface $S_1$ while each trailing edge 50 lies upon imaginary cylindrical surface $S_2$, spaced a distance "6" of between 0.4 mm and 0.6 mm from imaginary cylindrical surface $S_1$, this distance being referred to as the profile height. Each generally circumferentially extending facet 44 has a thickness "t" of between about 2.3 and 2.5 mm and is inclined toward the upstream at an angle "α" of between about 76° and 80° its respective diametrally extending centerline ₵. Slit 52 having a width "w" of between about 0.11 mm and 0.145 mm is defined between upstream generally diametrally extending facet 46 of each vane 32 and downstream generally diametrally extending facet 42 of the next vane upstream therefrom. Together the downstream generally diametrally extending facet 42, trailing edge 50, generally circumferentially extending facet 44 and upstream generally diametrally extending facet 46 collectively define the supply contacting surface 54 of screen basket 30.

Figure 3:
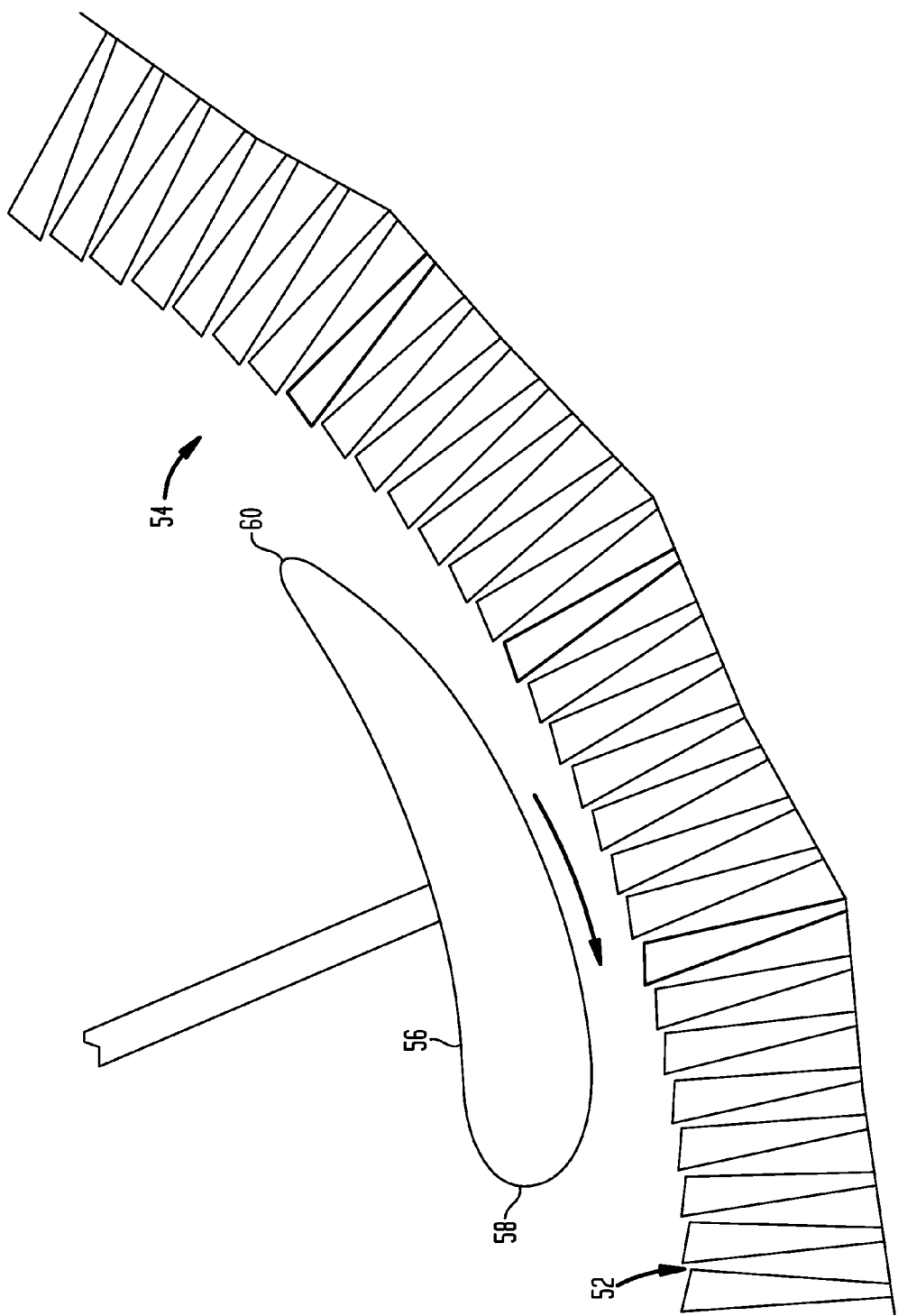
FIG. 3 is a schematic illustration of a foil in relation to several vanes of a screen basket.

FIG. 3 illustrates foil 56 having leading edge 58 and trailing edge 60 defined thereupon. As leading edge 58 of foil 56 passes over each slit 52, it is theorized that it introduces a negative pressure upon the slit it is passing over tending to clear the slit of stickies and other debris that may be deposited there, while the positive pressure resulting after trailing edge 60 of foil 56 passes over slit 52 tends to drag fiber therethrough while incidentally forcing stickies and other debris against rejects supply contacting surface 54 of screen basket 30 (FIG. 1), there to remain until passage of a successive foil 56 induces negative pressure to dislodge stickies and debris. In conventional practice, the clearance between the supply contacting surface 54 and foil 56 is a small fraction of an inch or just a few millimeters.

Figure 4:
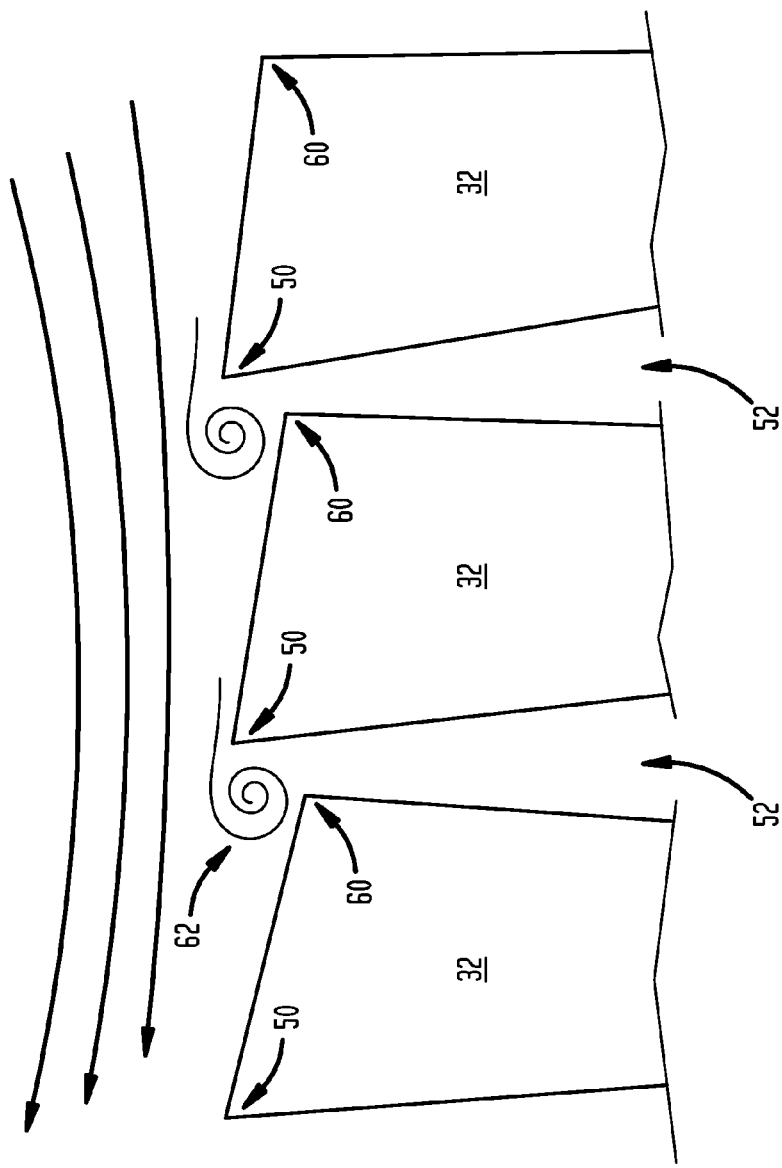
FIG. 4 is a schematic illustration of the theorized flow pattern in the neighborhood of the slits in a screen basket of the present invention.
Figure 5:
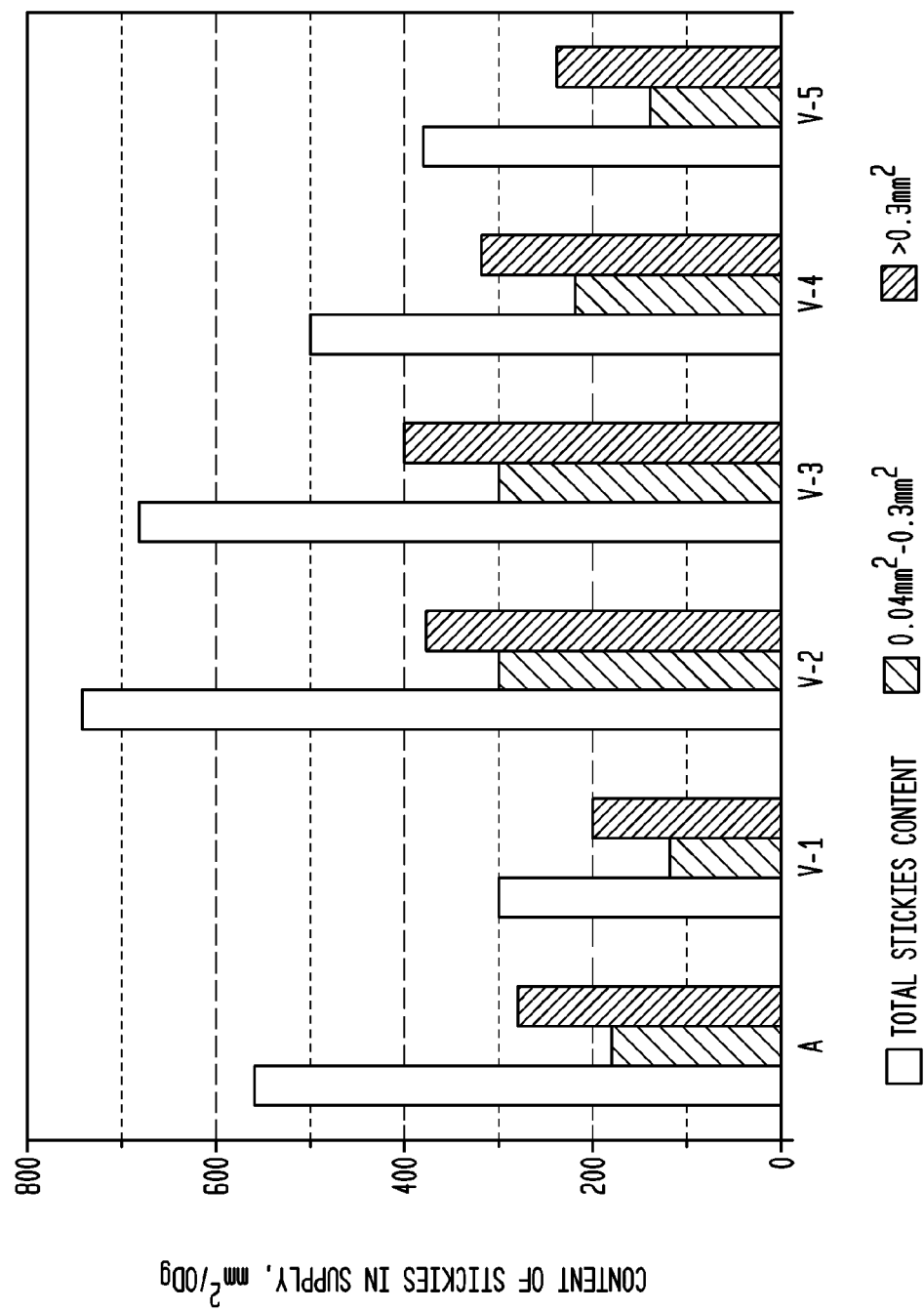
FIG. 5 illustrates the distribution of stickies by size in the supply streams used in experiments conducted to determine the effectiveness of several screen baskets.
Figure 6:
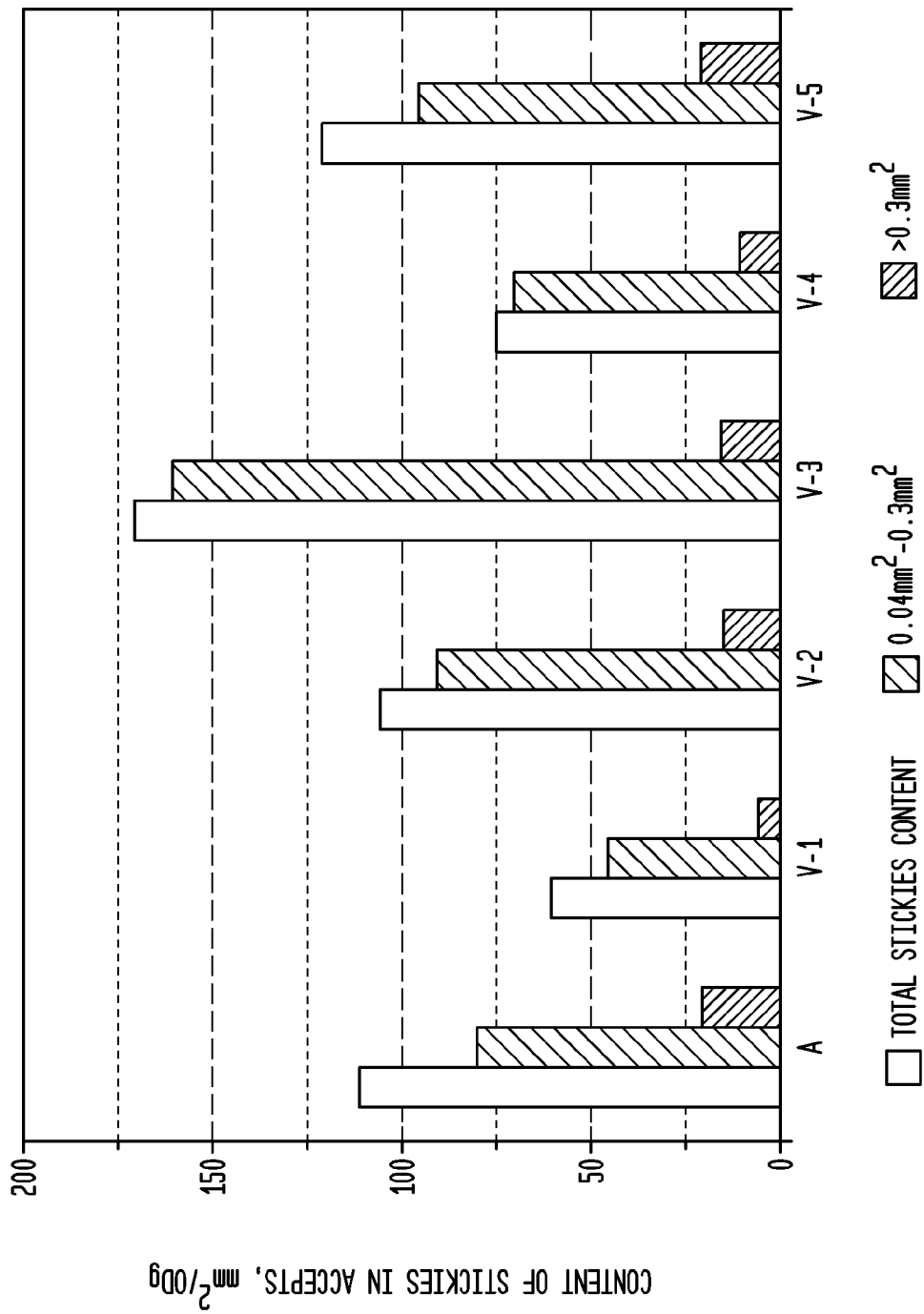
FIG. 6 illustrates the distribution of stickies by size in the accepts streams obtained in experiments conducted to determine the effectiveness of several screen baskets.
Figure 7:
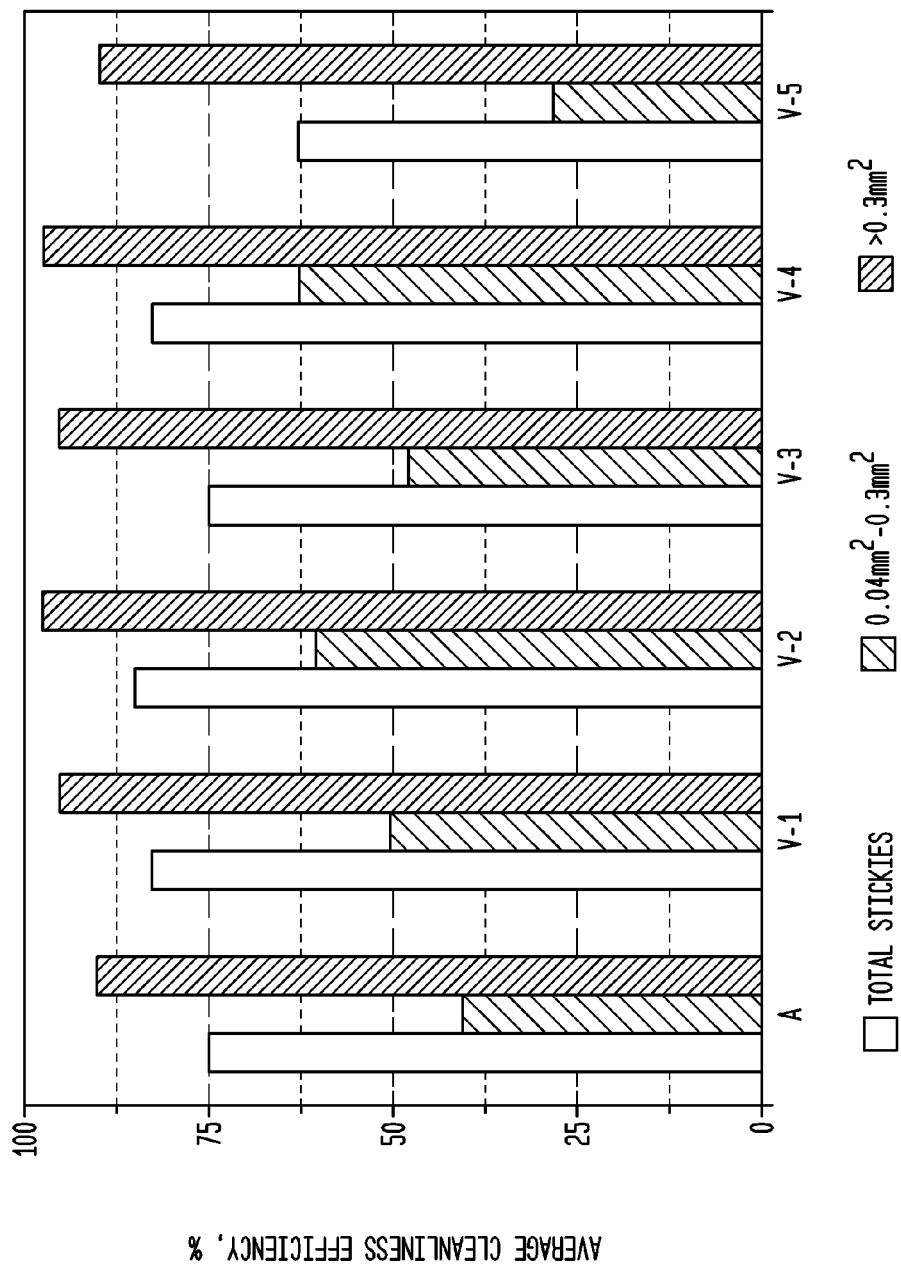
FIG. 7 illustrates the Average Cleanliness Efficiencies obtained for the various size ranges of stickies obtained in experiments conducted to determine the effectiveness of several screen baskets.
Figure 8:
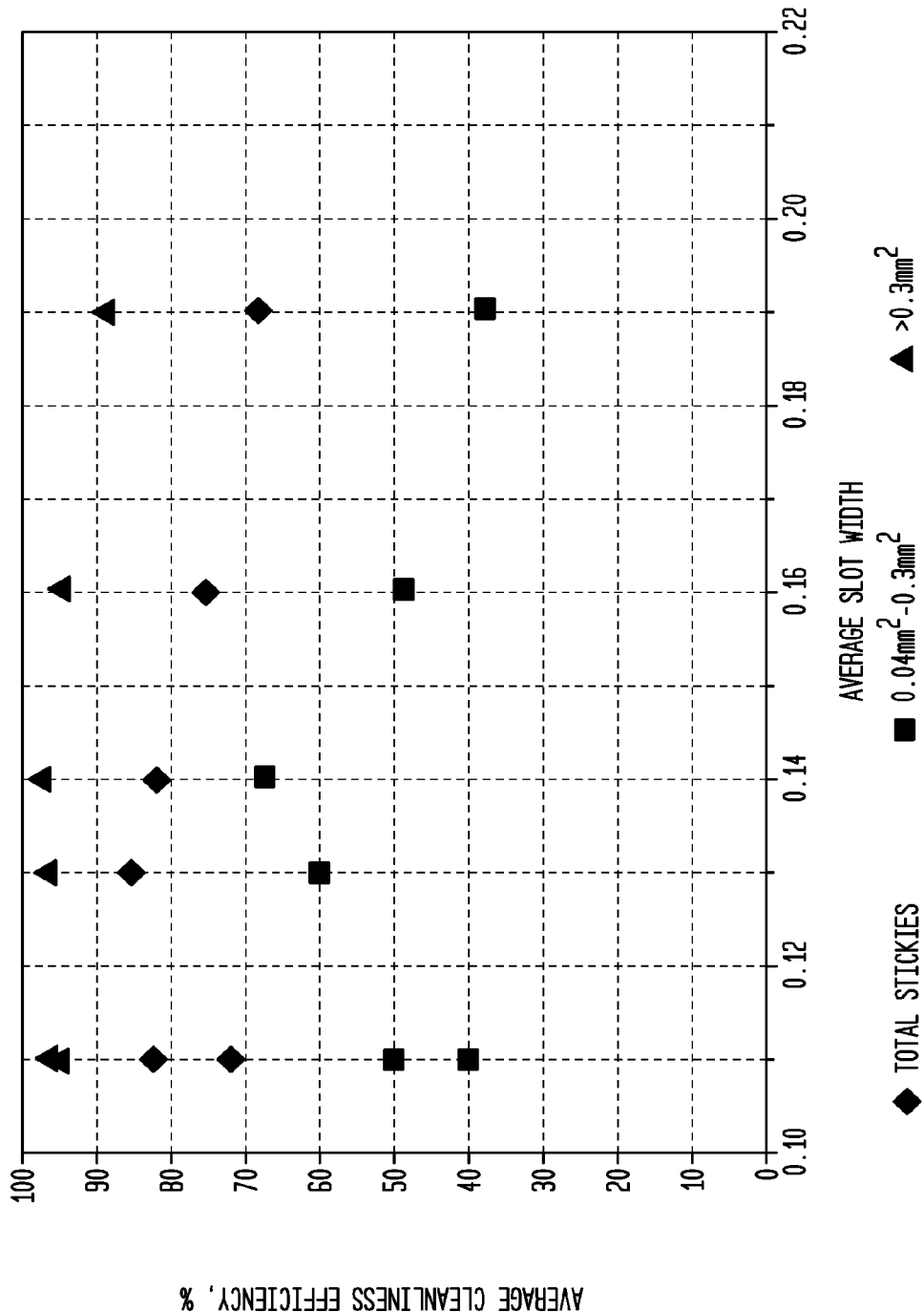
FIG. 8 illustrates the relationship between the Average Cleanliness Efficiencies obtained for the various size ranges of stickies and the slot widths of the screens used in experiments conducted to determine the effectiveness of several screen baskets.
Figure 9:
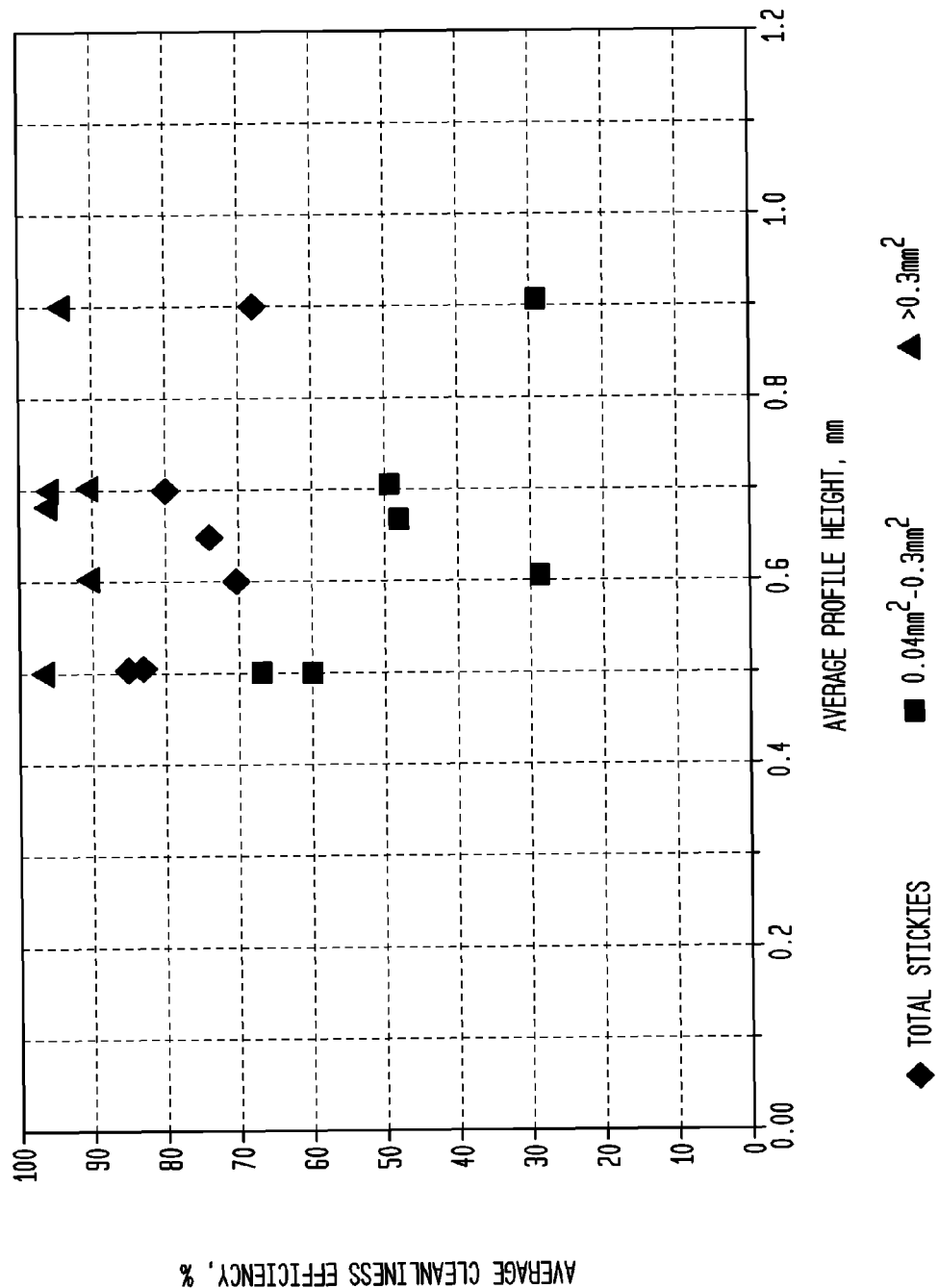
FIG. 9 illustrates the relationship between the Average Cleanliness Efficiencies obtained for the various size ranges of stickies and the profile heights of the screens used in experiments conducted to determine the effectiveness of several screen baskets.
Figure 10:
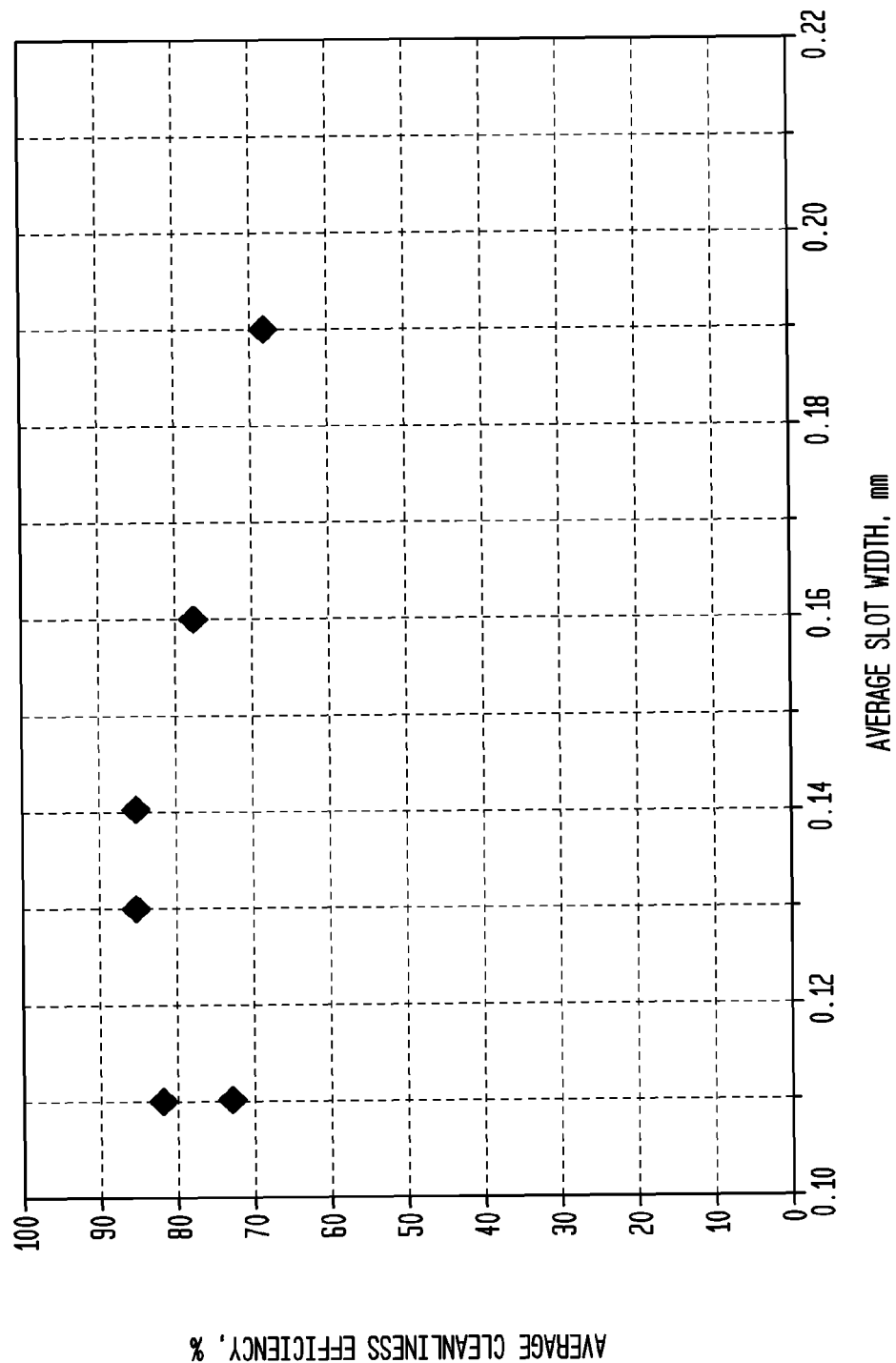
FIG. 10 illustrates the relationship between the Overall Average Cleanliness Efficiencies obtained and the slot width of the screens used in experiments conducted to determine the effectiveness of several screen baskets.

FIG. 4 illustrates the hypothetical formation of vortices 62 as flow passes over trailing edge 50 of each vane 32. Some have theorized that proper formation of vortices 62 helps to align fibers with slit 52 easing the passage of longer fibers through slit 52. Others have hypothesized that proper formation of vortices ameliorates the formation of deposits between the slits of the screen.

Six different screen baskets having the general configuration illustrated in FIG. 1 were evaluated with recycled fiber samples collected from industrial, commercial and post-consumer waste pulp recycling operations. The slot width and profile height for each of the screen baskets, as reported by the manufacturers, are set forth in Table 1. Upon microscopic inspection, it was determined that the geometry of the screen baskets varied considerably from that stated by the manufacturer in several cases. Table 1 compares the Actual Screen Basket Geometry to that reported by the manufacturers.

TABLE 1

| Screen Basket Label | Reported Screen Basket Specifications | | Actual Screen Basket Geometry | |
|---|---|---|---|---|
| | Slot Width, mm | Profile Height, mm | Slot Width, mm | Profile Height, mm |
| A | 0.10 | 0.9 | 0.11 | 0.90 |
| V-1 | 0.11 | 0.7 | 0.11 | 0.70 |
| V-2 | 0.12 | 0.5 | 0.13 | 0.50 |
| V-3 | 0.15 | 0.7 | 0.16 | 0.67 |
| V-4 | 0.15 | 0.7 | 0.14 | 0.51 |
| V-5 | 0.15 | 0.7 | 0.19 | 0.62 |

Over a period of several months, the screen baskets were evaluated with pulp samples having average stickies contents and size variations as set forth in Table 2.

TABLE 2

| | Supply Stickies (per 100 OD g basis) | | | | | | | |
|---|---|---|---|---|---|---|---|---|
| | 0.001-0.04 mm$^2$ | | >0.04 mm$^2$ | | 0.04-0.3 mm$^2$ | | >0.3 mm$^2$ | |
| | Count | Area | Count | Area | Count | Area | Count | Area |
| A | 3,571 | 28.5 | 1,859 | 474.7 | 1,494 | 185.3 | 365 | 289.4 |
| V-1 | 2,076 | 16.9 | 1,152 | 305.6 | 936 | 117.3 | 216 | 188.3 |
| V-2 | 4,674 | 40.0 | 2,830 | 739.2 | 2,262 | 282.1 | 568 | 457.1 |
| V-3 | 2,650 | 43.2 | 2,957 | 680.2 | 2,448 | 305.5 | 509 | 374.7 |
| V-4 | 3,805 | 30.6 | 1,997 | 473.2 | 1,672 | 208.2 | 325 | 265.0 |
| V-5 | 5,090 | 20.5 | 1,355 | 381.5 | 1,064 | 135.5 | 291 | 246.0 |

On a gross basis the results obtained are set forth in the two parts of Table 3.

TABLE 3

(part 2)

| | Thickening Factor | Vol. Reject Rate, % | OD Reject Rate, % | Slot Vel. m/s |
|---|---|---|---|---|
| A | 1.36 | 14.0 | 19.0 | 1.29 |
| V-1 | 1.31 | 12.3 | 16.4 | 1.38 |
| V-2 | 1.29 | 16.6 | 21.5 | 1.52 |
| V-3 | 1.42 | 12.3 | 17.3 | 1.58 |
| V-4 | 1.33 | 12.3 | 16.5 | 1.60 |
| V-5 | 1.25 | 12.3 | 15.4 | 1.54 |

The accepts stream samples from the screen were evaluated for stickies content with average results as set forth in Table 4.

TABLE 4

| | Accepts Stickies (per 100 OD g basis) | | | | | | | |
|---|---|---|---|---|---|---|---|---|
| | 0.001-0.04 mm$^2$ | | >0.04 mm$^2$ | | 0.04-0.3 mm$^2$ | | >0.3 mm$^2$ | |
| | Count | Area | Count | Area | Count | Area | Count | Area |
| A | 1,973 | 16.7 | 969 | 123.7 | 927 | 105.2 | 42 | 18.5 |
| V-1 | 1,388 | 10.2 | 493 | 59.1 | 476 | 52.2 | 17 | 6.8 |
| V-2 | 1,734 | 16.4 | 896 | 103.0 | 876 | 91.2 | 20 | 11.8 |
| V-3 | 2,717 | 24.9 | 1,520 | 172.0 | 1,490 | 160.5 | 30 | 11.5 |
| V-4 | 1,537 | 12.1 | 632 | 72.5 | 619 | 66.4 | 12 | 6.1 |
| V-5 | 1,595 | 13.0 | 854 | 120.6 | 801 | 98.1 | 54 | 22.5 |

Figure 11:
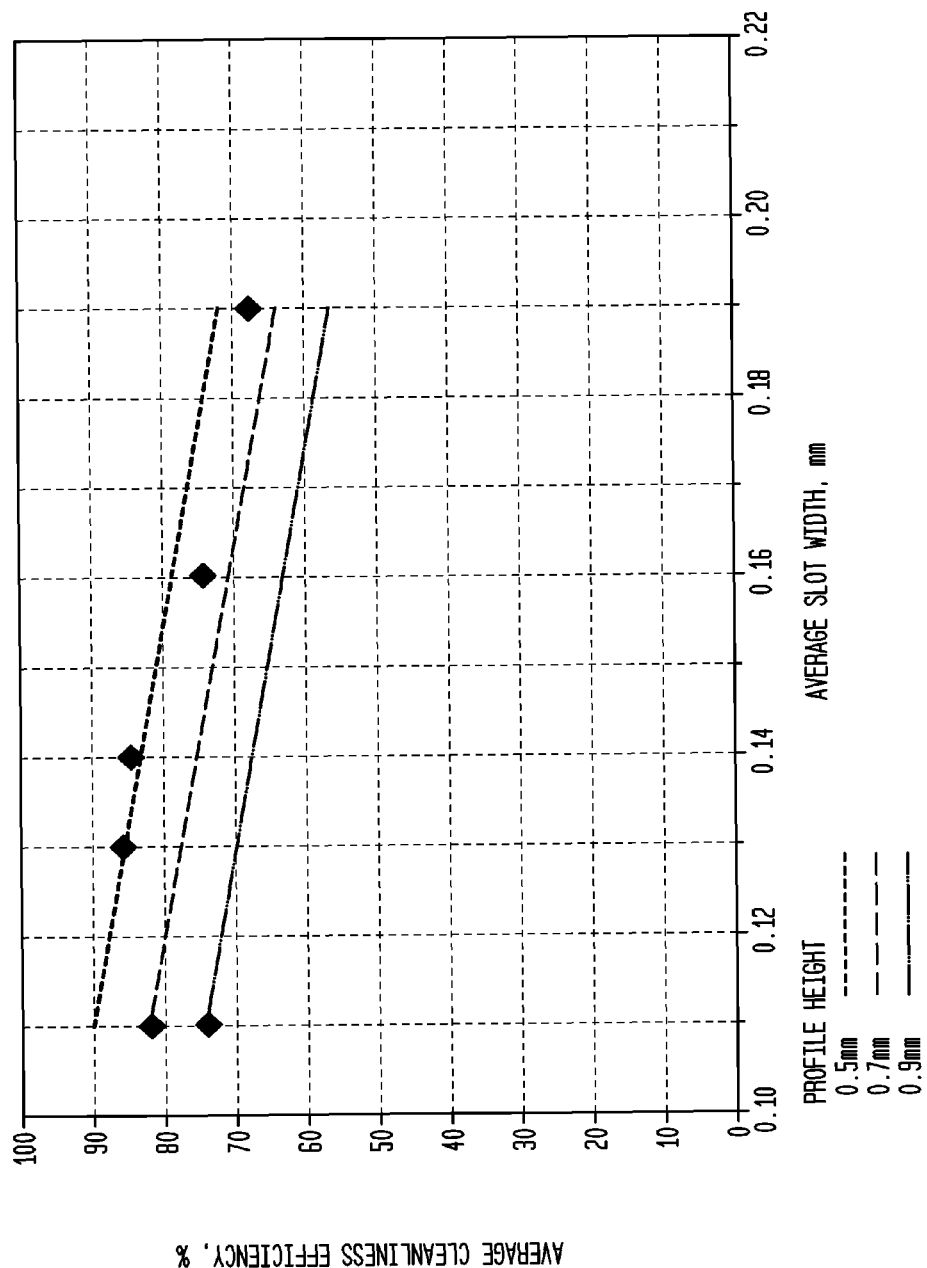
FIG. 11 illustrates the correlation obtained between the Overall Average Cleanliness Efficiencies and the slot widths and profile heights of the screens used in experiments conducted to determine the effectiveness of several screen baskets.
Figure 12:
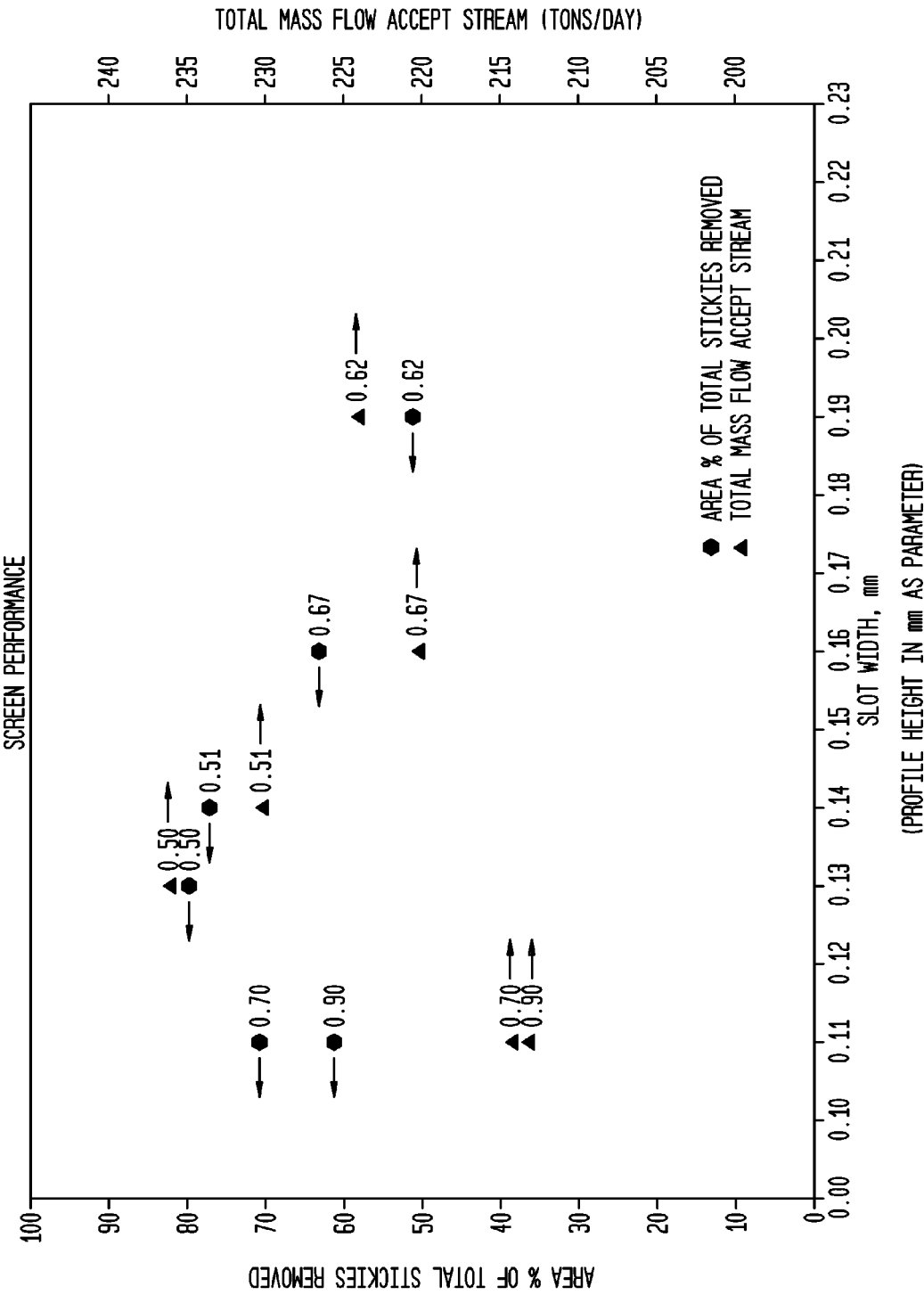
FIG. 12 sets forth both the Area % of total stickies removed and the total mass flow of the accepts streams for each of the screens evaluated with profile height being indicated for each data point.
Figure 13:
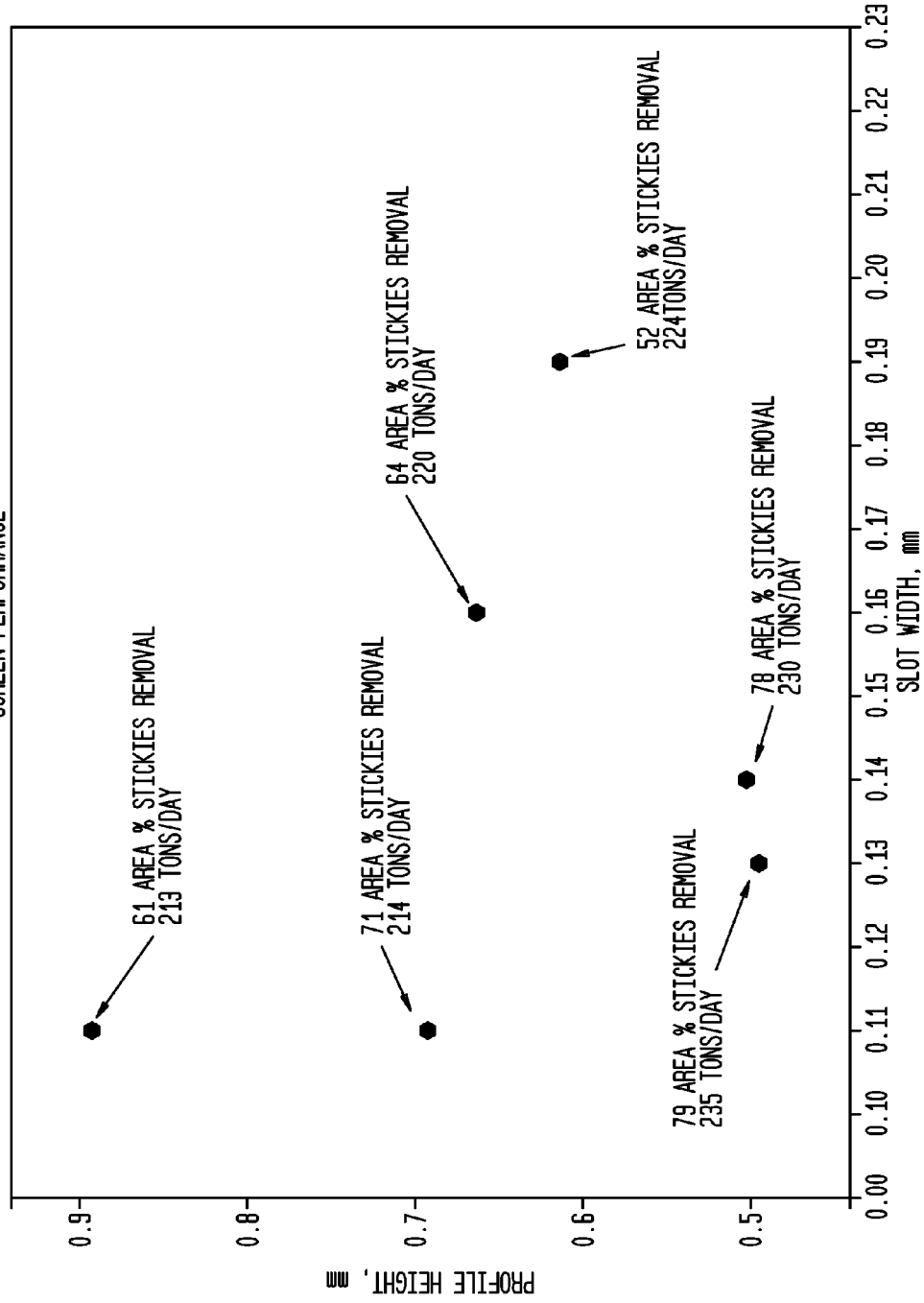
FIG. 13 sets forth both the Area % of total stickies removed and the total mass flow of the accepts streams for each of the screens evaluated with accepts tonnage being indicated for each data point.
Figure 14:
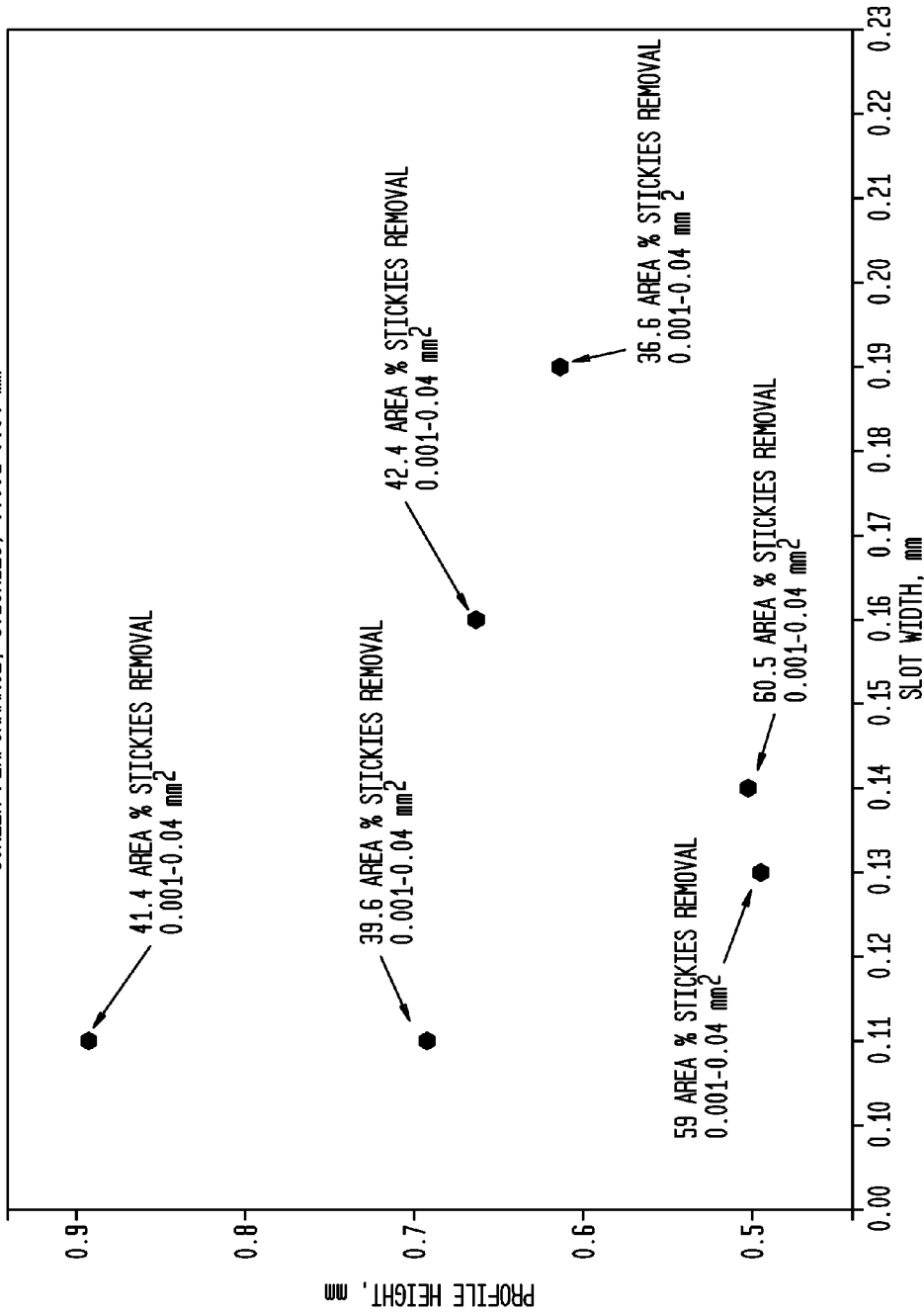
FIG. 14 sets forth the Area % of total stickies removed in the size range of 0.001 to 0.04 mm$^2$ on a grid of the slot width and profile height for each of the screens evaluated.
Figure 15:
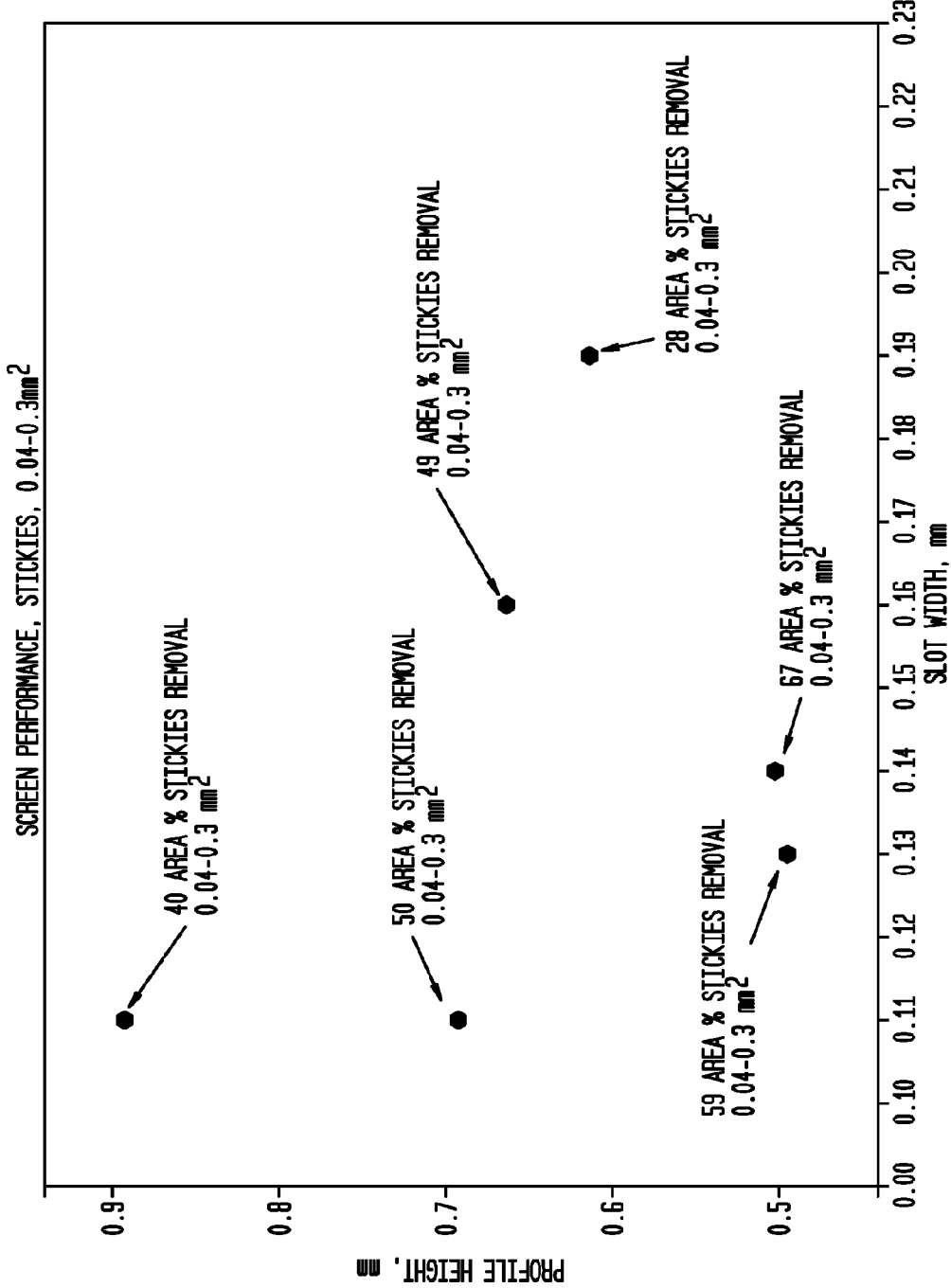
FIG. 15 sets forth the Area % of total stickies removed in the size range of 0.04 to 0.3 mm$^2$ on a grid of the slot width and profile height for each of the screens evaluated.
Figure 16:
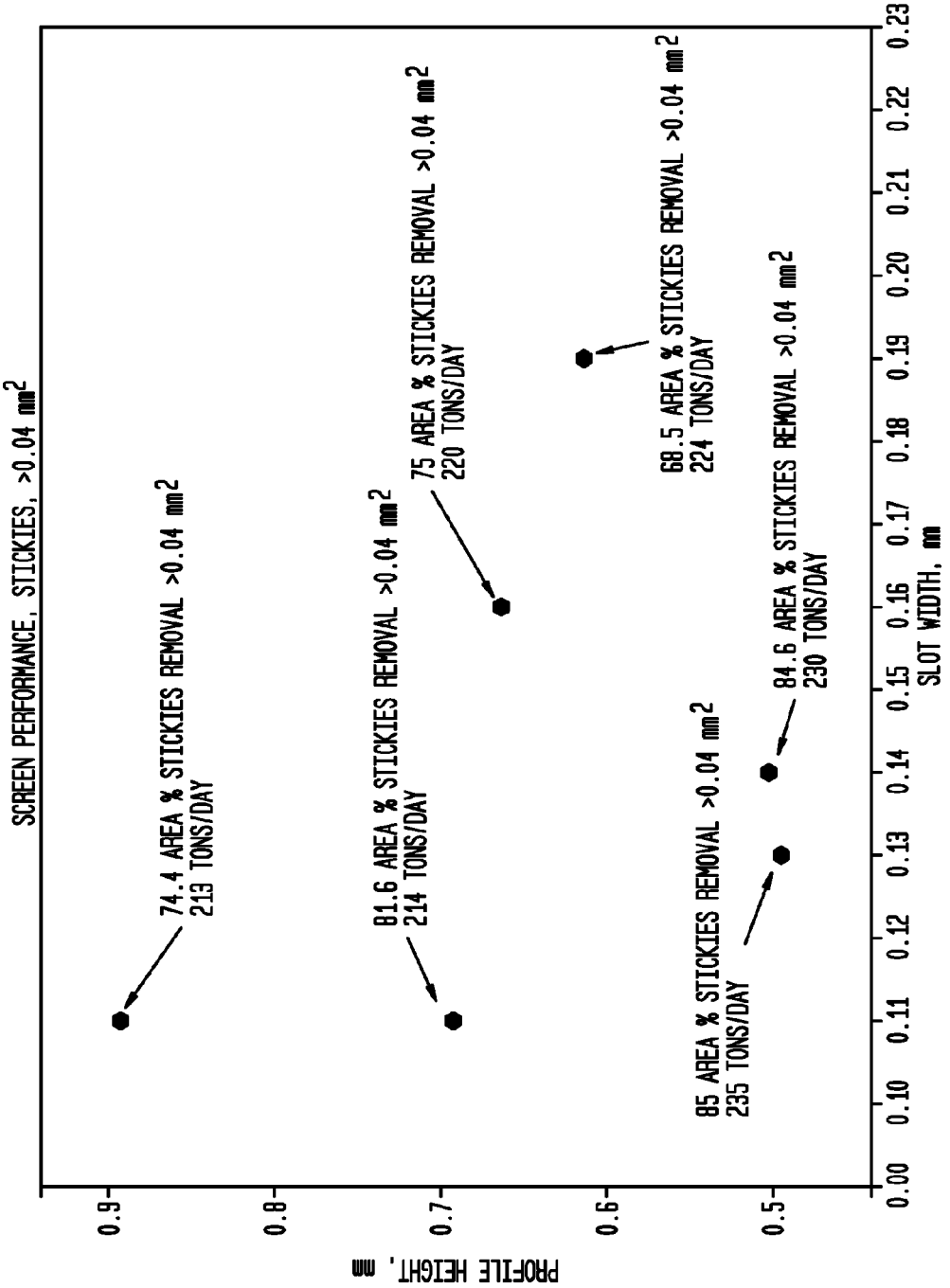
FIG. 16 sets forth the Area % of total stickies removed in the size range of greater than 0.04 mm$^2$ on a grid of the slot width and profile height for each of the screens evaluated.
Figure 17:
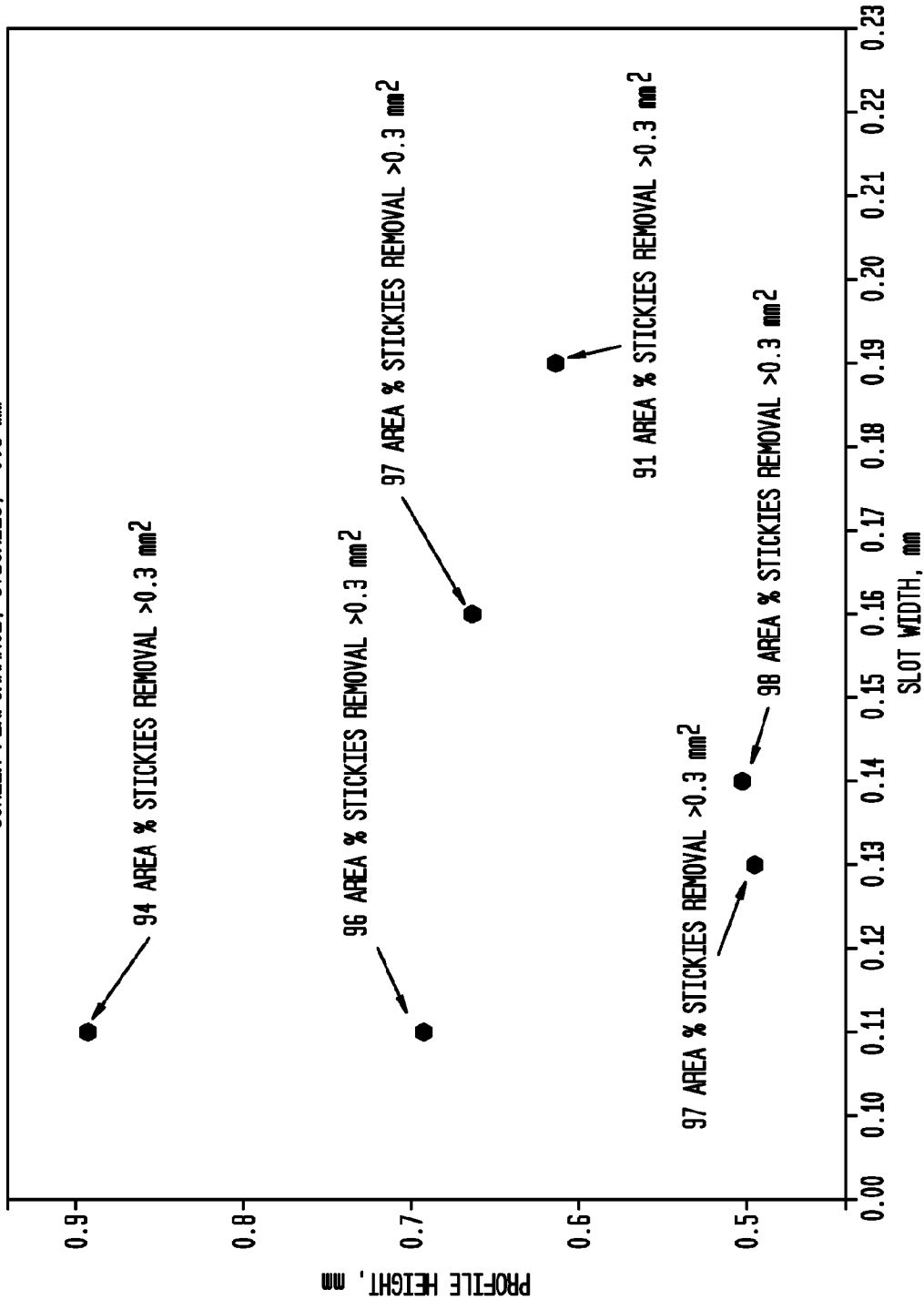
FIG. 17 sets forth the Area % of total stickies removed in the size range of greater than 0.3 mm$^2$ on a grid of the slot width and profile height for each of the screens evaluated.

From these results, cleanliness efficiencies were obtained on both a number basis and an area basis as set forth in the three parts of Table 5. These results are also presented graphically in FIGS. 5-10 while FIG. 11 presents a correlation between slot width, profile height and average cleanliness efficiency.

TABLE 3

(part 1)

| | Reject Ratio | Supply | | | Accepts | | | | Rejects | | | | Mass Flow (ODSTPD) | | | Production |
|---|---|---|---|---|---|---|---|---|---|---|---|---|---|---|---|---|
| | | % TSS | % Ash | % Cons | GPM | % TSS | % Ash | % Cons | GPM | % TSS | % Ash | % Cons | Accept | Rejects | Supply | ODSTPD |
| A | 0.16 | 1.10 | 6.88 | 1.02 | 3,466 | 0.99 | 7.39 | 0.94 | 565 | 1.51 | 5.66 | 1.40 | 213 | 50 | 263 | 373 |
| V-1 | 0.14 | 1.08 | 6.95 | 1.01 | 3,527 | 1.01 | 7.42 | 0.94 | 494 | 1.41 | 5.67 | 1.33 | 214 | 42 | 256 | 366 |
| V-2 | 0.20 | 1.17 | 7.41 | 1.09 | 3,536 | 1.10 | 7.58 | 1.02 | 704 | 1.51 | 5.98 | 1.42 | 235 | 64 | 299 | 393 |
| V-3 | 0.14 | 1.05 | 5.82 | 0.99 | 3,665 | 1.00 | 6.07 | 0.94 | 512 | 1.49 | 4.64 | 1.42 | 220 | 46 | 266 | 386 |
| V-4 | 0.14 | 1.09 | 7.29 | 1.01 | 3,716 | 1.03 | 7.45 | 0.95 | 520 | 1.45 | 6.06 | 1.36 | 230 | 45 | 275 | 393 |
| V-5 | 0.14 | 1.08 | 7.39 | 1.00 | 3,574 | 1.04 | 7.52 | 0.96 | 501 | 1.35 | 6.26 | 1.26 | 224 | 41 | 265 | 375 |

TABLE 5

(part 1)

| | Cleanliness Efficiency (Area) | | | Cleanliness Efficiency (Count) | | |
|---|---|---|---|---|---|---|
| | >0.04 mm², % | 0.04-0.3 mm², % | >0.3 mm², % | >0.04 mm², % | 0.04-0.3 mm², % | >0.3 mm², % |
| A | 74.4 | 40 | 94 | 49.1 | 39 | 89 |
| V-1 | 81.6 | 50 | 96 | 58.7 | 50 | 93 |
| V-2 | 85.1 | 59 | 97 | 66.8 | 59 | 96 |
| V-3 | 75.0 | 49 | 97 | 49.7 | 41 | 94 |
| V-4 | 84.6 | 67 | 98 | 68.2 | 63 | 96 |
| V-5 | 68.5 | 28 | 91 | 37.7 | 25 | 83 |

TABLE 5

(part 2)

| Screen | | Capacity | | Stickies | | Cleanliness Efficiency (Area) | | |
|---|---|---|---|---|---|---|---|---|
| Slot Width, mm | Profile Height, mm | Tons per day in Accept Stream | Tons per day in Supply Stream | Total area of Stickies in Supply | Area % Stickies Removal Efficiency | >0.04 mm², % | 0.04-0.3 mm², % | >0.3 mm², % |
| A-1 | 0.11 | 0.90 | 213 | 263 | 688.6 | 61.7 | 74.4 | 40 | 94 |
| V-1 | 0.11 | 0.70 | 214 | 256 | 439.7 | 70.8 | 81.6 | 50 | 96 |
| V-2 | 0.13 | 0.50 | 235 | 299 | 1061.3 | 79.0 | 85.1 | 59 | 97 |
| V-3 | 0.16 | 0.67 | 220 | 266 | 1028.9 | 64.1 | 75 | 49 | 97 |
| V-4 | 0.14 | 0.51 | 230 | 275 | 712.0 | 77.9 | 84.6 | 67 | 98 |
| V-5 | 0.19 | 0.62 | 224 | 265 | 537.4 | 527 | 68.5 | 28 | 91 |

*Note: The A-1 row has values shifted; reading by column position:*

| | Slot Width, mm | Profile Height, mm | Tons per day in Accept Stream | Tons per day in Supply Stream | Total area of Stickies in Supply | Area % Stickies Removal Efficiency | >0.04 mm², % | 0.04-0.3 mm², % | >0.3 mm², % |
|---|---|---|---|---|---|---|---|---|---|
| A-1 | 0.11 | 0.90 | 213 | 263 | 688.6 | 61.7 | 74.4 | 40 | 94 |

FIGS. 12-17 graphically present relationships between slot width, profile height and stickies removal with tonnage production being noted for each case.

TABLE 5

(part 3)

| Screen | | Stickies Total area of Stickies in Supply 0.001-0.04 mm² | Total area of Stickies in Accepts 0.001-0.04 mm² | Area % Stickies Removal Efficiency 0.001-0.04 mm² |
|---|---|---|---|---|
| Slot Width, mm | Profile Height, mm | | | |
| A-1 | 0.11 | 0.90 | 28.5 | 16.7 | 41.4% |
| V-1 | 0.11 | 0.70 | 16.9 | 10.2 | 39.6% |
| V-2 | 0.13 | 0.50 | 40.0 | 16.4 | 59% |
| V-3 | 0.16 | 0.67 | 43.2 | 24.9 | 42.4% |
| V-4 | 0.14 | 0.51 | 30.6 | 12.1 | 60.5% |
| V-5 | 0.19 | 0.62 | 20.5 | 13.0 | 36.6% |

As the demand on the fiber processing lines typically varies from time to time depending upon the paper machine needs, it is quite advantageous for a screen design to be able to provide a relatively consistent output over a range of throughputs. To demonstrate the ability of screen designs of the present invention to handle variations in throughputs, during the series of trials above, the performance of the screen was recorded as the slot velocity was varied. The following tables (Tables 6-11) record the Cleanliness Efficiencies of the several screen designs set forth over a range of slot velocities.

EXAMPLE 1 (COMPARATIVE)

Figure 18:
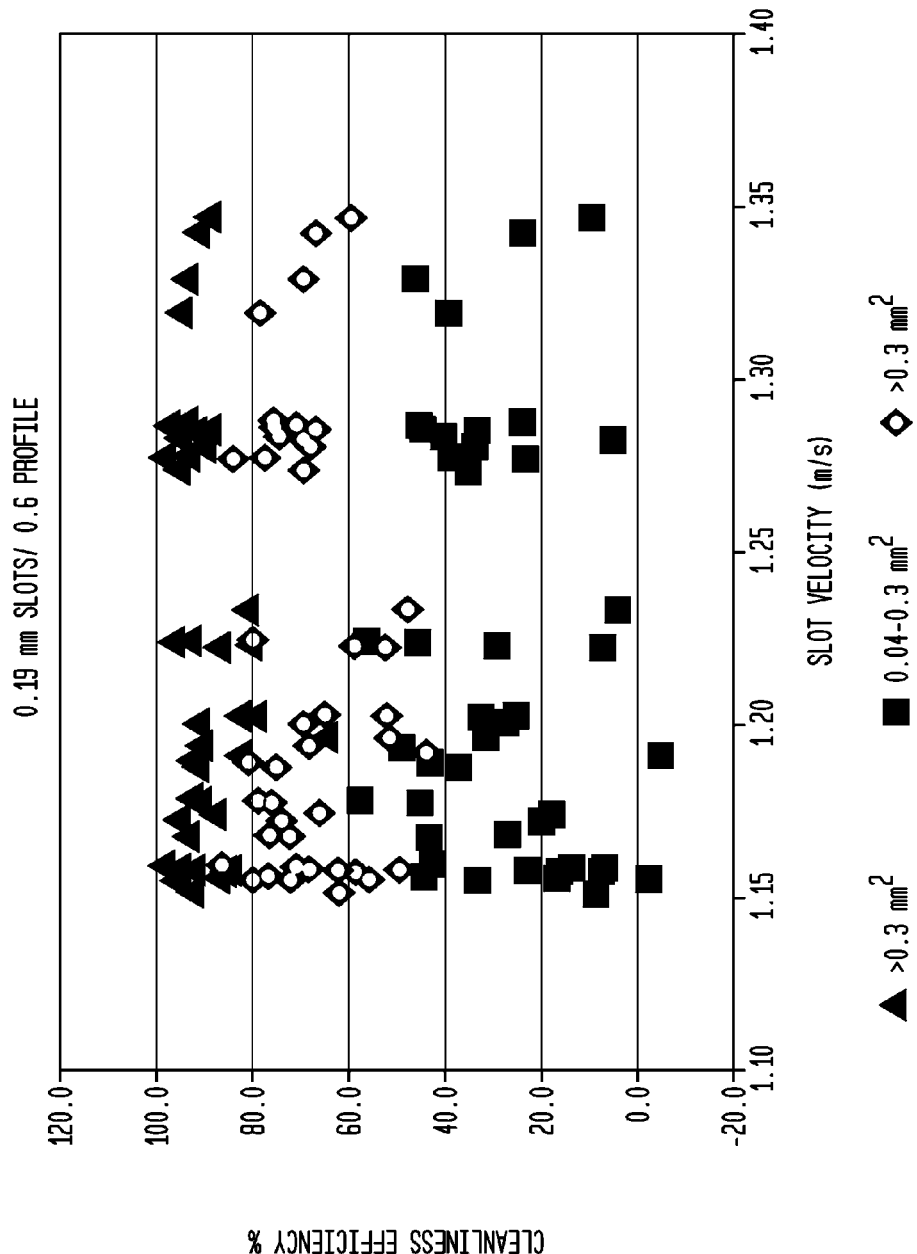
FIG. 18 illustrates the wide variations in Cleanliness Efficiencies resulting for each of the several size ranges of stickies as slot velocity was varied for a screen basket with 0.19 mm slots and a profile height of 0.6 mm.

Table 6 describes the performance of a screen, not of the present invention, in the above-described evaluation. FIG. 18 sets forth those results graphically. It can be appreciated that not only are the efficiencies rather low but that they vary widely as slot velocity is varied, making it quite difficult to reliably control the input to the papermaking process as demand for fiber is varied. (Throughout the Examples, where the last line of a table is separated from the lines above it by a heavy horizontal line, the values in that last line are averages of the figures above in that table.)

TABLE 6

Screen Basket V-5 - Slot Width 0.19 mm/Profile Height 0.62 mm

| Slot velocity (m/s) | Cleanliness Efficiencies (%) Stickies Area Size Ranges | | |
|---|---|---|---|
| | >0.04 mm² | 0.04-0.3 mm² | >0.3 mm² |
| 1.28 | 67.3 | 33.3 | 91.7 |
| 1.27 | 69.5 | 35.3 | 95.4 |
| 1.28 | 68.7 | 5.2 | 95.1 |
| 1.29 | 75.5 | 24.1 | 93.9 |

TABLE 6-continued

Screen Basket V-5 - Slot Width 0.19 mm/Profile Height 0.62 mm

| Slot velocity | Cleanliness Efficiencies (%) Stickies Area Size Ranges | | |
|---|---|---|---|
| (m/s) | >0.04 mm$^2$ | 0.04-0.3 mm$^2$ | >0.3 mm$^2$ |
| 1.28 | 74.6 | 40.0 | 90.2 |
| 1.28 | 77.3 | 38.7 | 93.8 |
| 1.16 | 76.5 | 44.3 | 93.3 |
| 1.16 | 58.5 | 16.4 | 86.0 |
| 1.19 | 43.6 | −5.0 | 82.7 |
| 1.20 | 69.1 | 27.7 | 91.5 |
| 1.20 | 65.0 | 25.6 | 82.8 |
| 1.20 | 51.9 | 31.2 | 65.7 |
| 1.16 | 49.5 | 23.0 | 84.8 |
| 1.16 | 70.3 | 7.2 | 95.5 |
| 1.18 | 76.5 | 45.2 | 91.1 |
| 1.17 | 66.0 | 18.0 | 88.0 |
| 1.17 | 76.2 | 27.0 | 94.0 |
| 1.17 | 72.1 | 43.4 | 93.2 |
| 1.15 | 79.6 | 33.4 | 96.4 |
| 1.22 | 58.9 | 29.3 | 80.6 |
| 1.16 | 72.0 | −2.3 | 95.4 |
| 1.16 | 68.2 | 13.8 | 92.6 |
| 1.19 | 75.1 | 37.2 | 91.8 |
| 1.19 | 80.5 | 43.3 | 92.9 |
| 1.29 | 71.1 | 45.3 | 97.1 |
| 1.28 | 68.2 | 33.9 | 90.3 |
| 1.15 | 62.1 | 8.9 | 92.9 |
| 1.16 | 56.0 | 16.7 | 87.0 |
| 1.23 | 47.9 | 4.3 | 81.2 |
| 1.22 | 52.5 | 7.4 | 87.2 |
| 1.19 | 68.6 | 48.7 | 90.8 |
| 1.20 | 52.1 | 32.5 | 79.9 |
| 1.22 | 79.3 | 56.0 | 93.3 |
| 1.22 | 79.0 | 45.7 | 96.6 |
| 1.28 | 83.8 | 23.5 | 98.4 |
| 1.29 | 75.2 | 44.9 | 89.5 |
| 1.16 | 62.3 | 7.8 | 96.2 |
| 1.16 | 86.0 | 42.9 | 98.3 |
| 1.18 | 78.0 | 57.4 | 92.7 |
| 1.17 | 74.0 | 19.8 | 95.3 |
| 1.32 | 78.3 | 39.3 | 95.1 |
| 1.33 | 69.1 | 46.2 | 93.9 |
| 1.34 | 66.7 | 23.9 | 91.5 |
| 1.35 | 59.5 | 9.7 | 88.9 |
| 1.22 | 68.5 | 28.4 | 90.8 |

EXAMPLE 2

Figure 19:
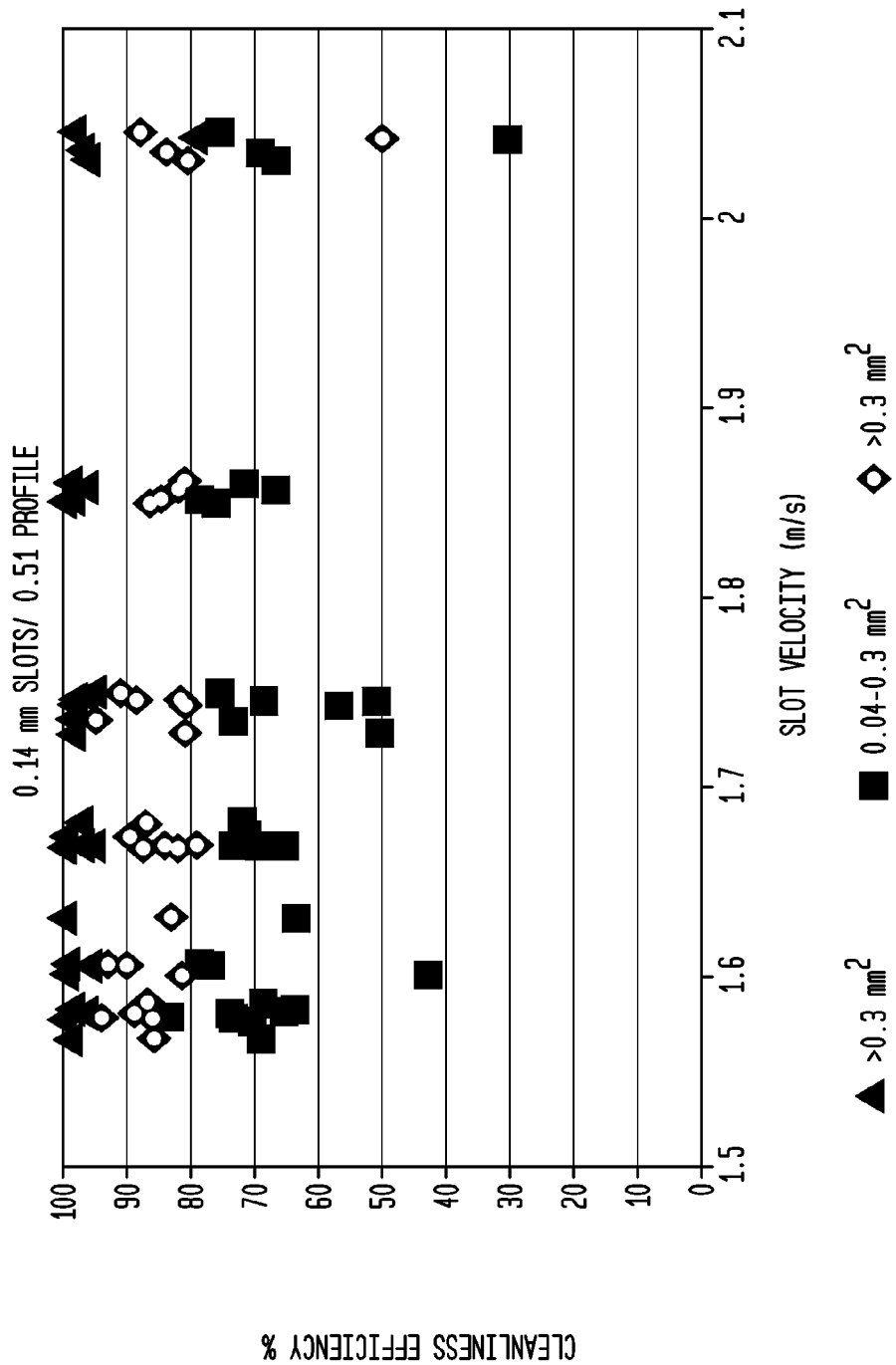
FIG. 19 illustrates the significant reductions in the variations in Cleanliness Efficiencies resulting for each of the several size ranges of stickies as slot velocity was varied for a screen basket with 0.14 mm slots and a profile height of 0.51 mm.

Table 7 sets forth results obtained with a screen which was found to be performing exceptionally well for unknown reasons. Upon close examination, it was determined that not only did it not match the specifications from the factory but it appeared that it had most likely worn considerably from its initial configuration. As the slot width was narrower than manufacturer's specification, it was considered apparent however that not all of the variation could be due to wear. FIG. 19 presents the results obtained with this screen graphically. It can be appreciated that the average efficiencies are not only very high but the results remain quite consistent over a wide range of slot velocities. These results led the present inventors to determine whether the outstanding and unexplained performance of this screen could be duplicated by manufacturing a screen with the same slot width and profile height.

TABLE 7

Screen Basket V-4 - Slot Width 0.14 mm/Profile Height 0.51 mm

| Slot Velocity | Cleanliness Efficiencies (%) Stickies Area Size Ranges | | |
|---|---|---|---|
| (m/s) | >0.04 mm$^2$ | 0.04-0.3 mm$^2$ | >0.3 mm$^2$ |
| 1.74 | 80.8 | 56.8 | 98.5 |
| 1.73 | 80.5 | 50.4 | 98.7 |
| 1.75 | 81.6 | 50.8 | 96.8 |
| 1.74 | 94.6 | 73.5 | 99.0 |
| 1.75 | 88.3 | 68.3 | 98.3 |
| 1.75 | 90.9 | 75.7 | 95.3 |
| 1.58 | 93.8 | 83.2 | 100.0 |
| 1.58 | 85.6 | 70.1 | 99.0 |
| 1.61 | 89.5 | 76.4 | 96.3 |
| 1.61 | 92.6 | 78.4 | 99.5 |
| 1.60 | 81.3 | 42.7 | 99.4 |
| 1.63 | 82.9 | 63.4 | 100.0 |
| 1.58 | 85.7 | 63.8 | 97.1 |
| 1.58 | 88.7 | 73.7 | 96.9 |
| 1.68 | 86.7 | 71.8 | 97.4 |
| 1.67 | 89.5 | 71.3 | 99.7 |
| 1.85 | 84.8 | 78.4 | 98.6 |
| 1.85 | 86.2 | 76.1 | 99.4 |
| 1.86 | 81.3 | 71.6 | 99.1 |
| 1.86 | 81.8 | 66.6 | 97.0 |
| 1.67 | 87.1 | 69.3 | 100.0 |
| 1.67 | 82.2 | 65.2 | 99.4 |
| 1.67 | 78.9 | 67.7 | 97.6 |
| 1.67 | 83.5 | 73.3 | 95.7 |
| 2.04 | 83.6 | 68.9 | 97.1 |
| 2.04 | 50.0 | 30.0 | 79.8 |
| 2.03 | 80.4 | 66.6 | 96.4 |
| 2.05 | 87.7 | 75.3 | 98.6 |
| 1.58 | 86.6 | 65.1 | 98.4 |
| 1.58 | 86.6 | 68.6 | 98.6 |
| 1.58 | 86.3 | 73.0 | 98.4 |
| 1.57 | 85.7 | 68.9 | 99.0 |
| 1.72 | 84.6 | 67.3 | 97.7 |

EXAMPLE 3

Figure 20:
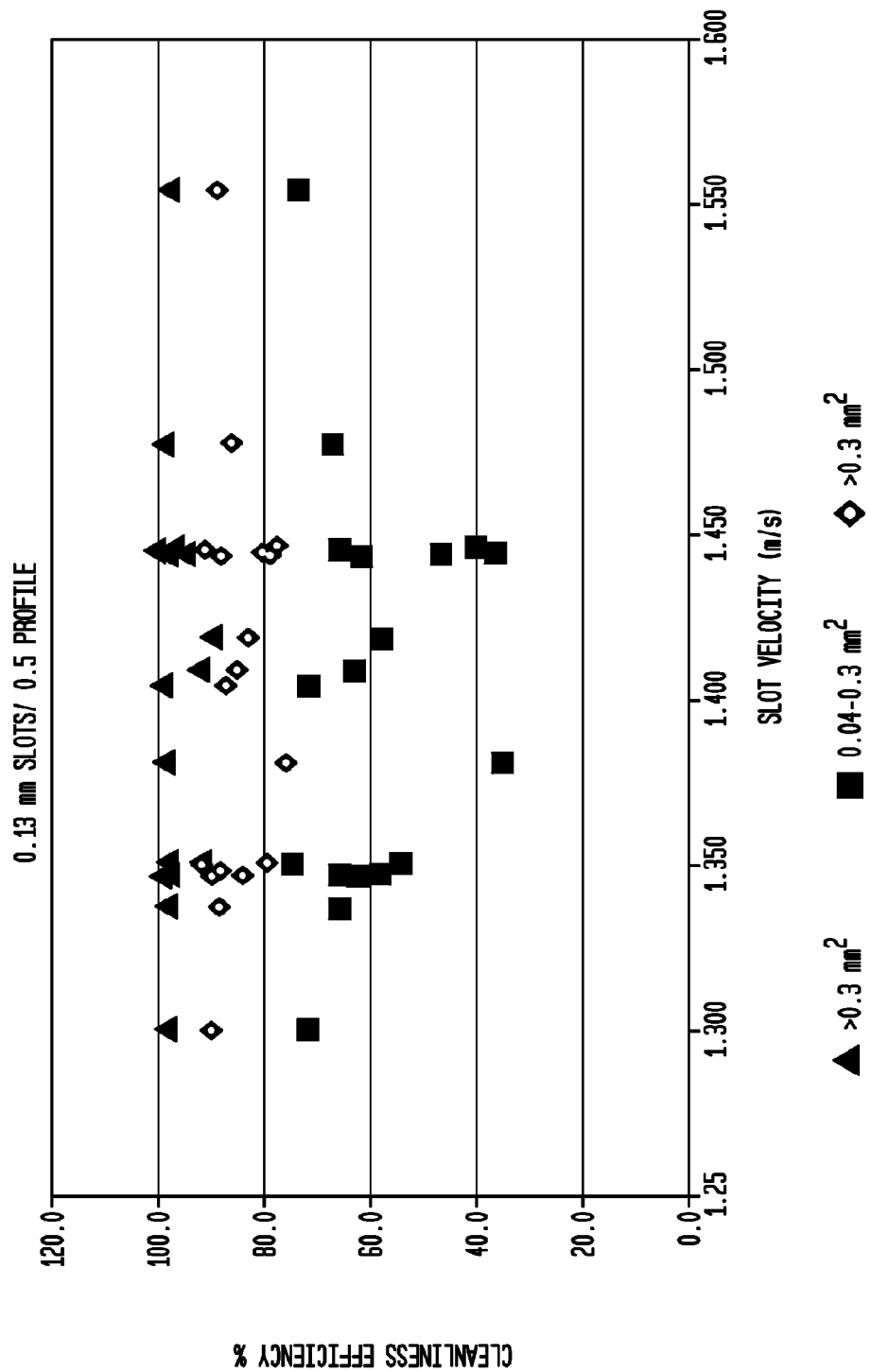

Table 8 presents the results obtained with a screen of the present invention, V-2 which attempted to achieve the same slot width and profile as found in screen V-4. The results obtained are presented graphically in FIG. 20. From these results, it can be appreciated that screen V-2 largely replicates the benefits of screen V-4.

TABLE 8

Screen Basket V-2 - Slot Width 0.13 mm/Profile Height 0.5 mm

| Slot Velocity | Cleanliness Efficiencies (%) Stickies Area Size Ranges | | |
|---|---|---|---|
| (m/s) | >0.04 mm$^2$ | 0.04-0.3 mm$^2$ | >0.3 mm$^2$ |
| 1.34 | 88.3 | 65.6 | 98.6 |
| 1.35 | 84.1 | 65.5 | 99.4 |
| 1.38 | 75.5 | 35.1 | 98.9 |
| 1.44 | 80.2 | 36.0 | 100.0 |
| 1.35 | 88.7 | 57.9 | 98.7 |
| 1.35 | 91.7 | 74.4 | 98.4 |
| 1.45 | 77.6 | 40.2 | 97.3 |
| 1.48 | 86.0 | 67.1 | 99.2 |
| 1.42 | 82.9 | 57.8 | 90.1 |
| 1.41 | 85.1 | 62.9 | 92.6 |
| 1.40 | 87.0 | 71.3 | 99.5 |
| 1.30 | 89.9 | 71.6 | 98.5 |
| 1.44 | 88.0 | 61.6 | 98.8 |
| 1.45 | 91.0 | 65.8 | 100.0 |
| 1.44 | 78.5 | 46.4 | 95.2 |
| 1.55 | 88.8 | 73.7 | 97.9 |

TABLE 8-continued

Screen Basket V-2 - Slot Width 0.13 mm/Profile Height 0.5 mm

| Slot Velocity | Cleanliness Efficiencies (%) Stickies Area Size Ranges | | |
|---|---|---|---|
| (m/s) | >0.04 mm² | 0.04-0.3 mm² | >0.3 mm² |
| 1.35 | 89.6 | 62.3 | 98.1 |
| 1.35 | 79.5 | 54.4 | 92.0 |
| 1.40 | 85.1 | 59.4 | 97.4 |

EXAMPLE 4 (COMPARATIVE)

Figure 21:
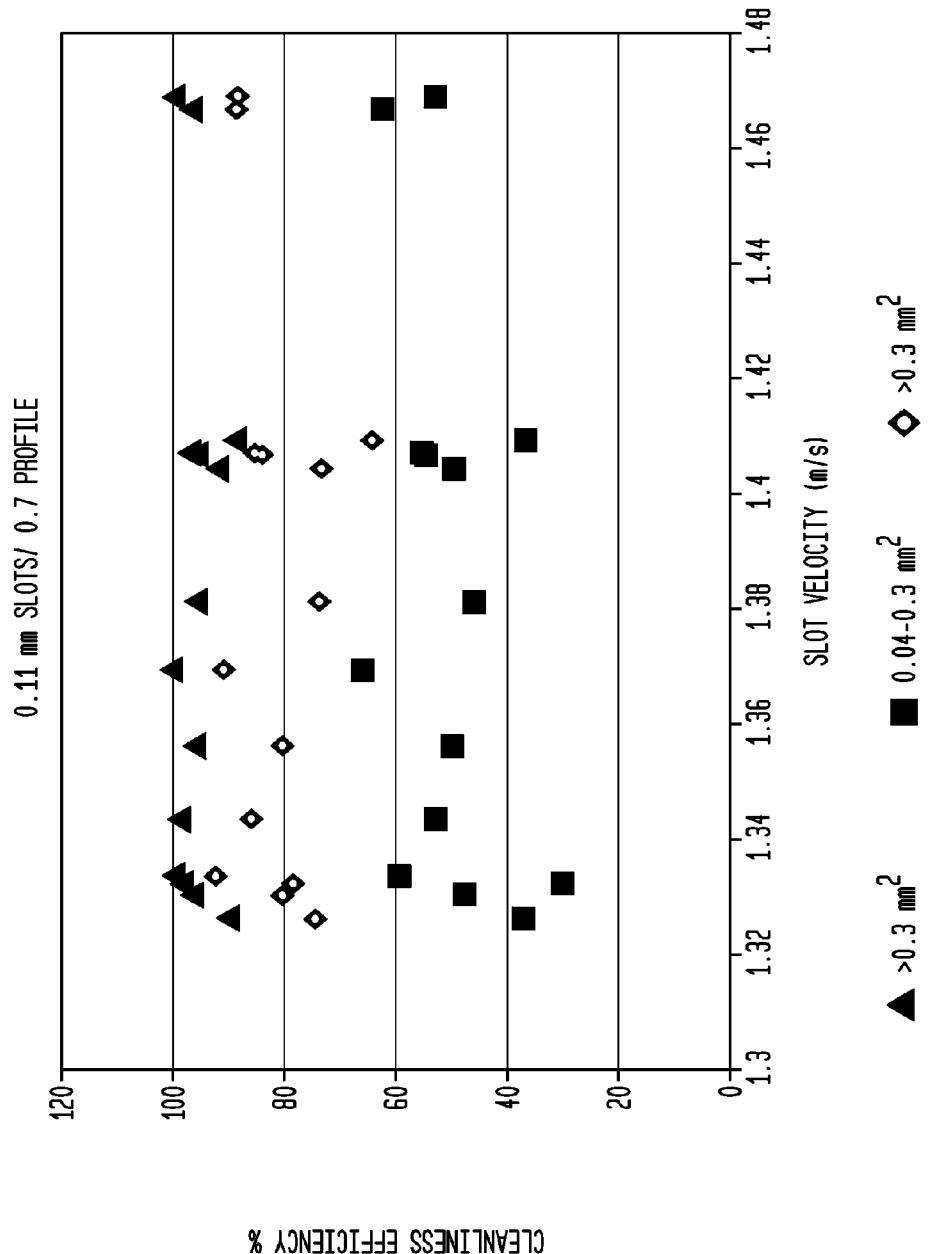

Table 9 sets forth the results obtained with another screen V-1, not of the invention, while those results are presented graphically in FIG. 21. While the results are somewhat consistent with slot velocity, it can be appreciated from FIG. 21, that the efficiency of Screen V-1 is far inferior to screens of the present invention.

TABLE 9

Screen Basket V-1 - Slot Width 0.11 mm/Profile Height 0.7 mm

| Slot Velocity | Cleanliness Efficiencies (%) Stickies Area Size Ranges | | |
|---|---|---|---|
| (m/s) | >0.04 mm² | 0.04-0.3 mm² | >0.3 mm² |
| 1.33 | 80.5 | 47.9 | 96.6 |
| 1.33 | 74.6 | 37.1 | 90.3 |
| 1.40 | 73.4 | 49.9 | 92.2 |
| 1.41 | 64.3 | 36.6 | 89.0 |
| 1.37 | 91.0 | 66.2 | 100.0 |
| 1.38 | 73.8 | 45.9 | 96.0 |
| 1.41 | 85.5 | 55.4 | 97.1 |
| 1.41 | 84.1 | 55.0 | 96.1 |
| 1.47 | 88.7 | 62.5 | 96.9 |
| 1.47 | 88.5 | 52.8 | 100.0 |
| 1.33 | 92.5 | 59.5 | 100.0 |
| 1.33 | 78.7 | 30.1 | 98.8 |
| 1.36 | 80.4 | 50.1 | 96.1 |
| 1.34 | 86.1 | 52.9 | 98.9 |
| 1.38 | 81.6 | 50.1 | 96.3 |

EXAMPLE 5 (COMPARATIVE)

Figure 22:
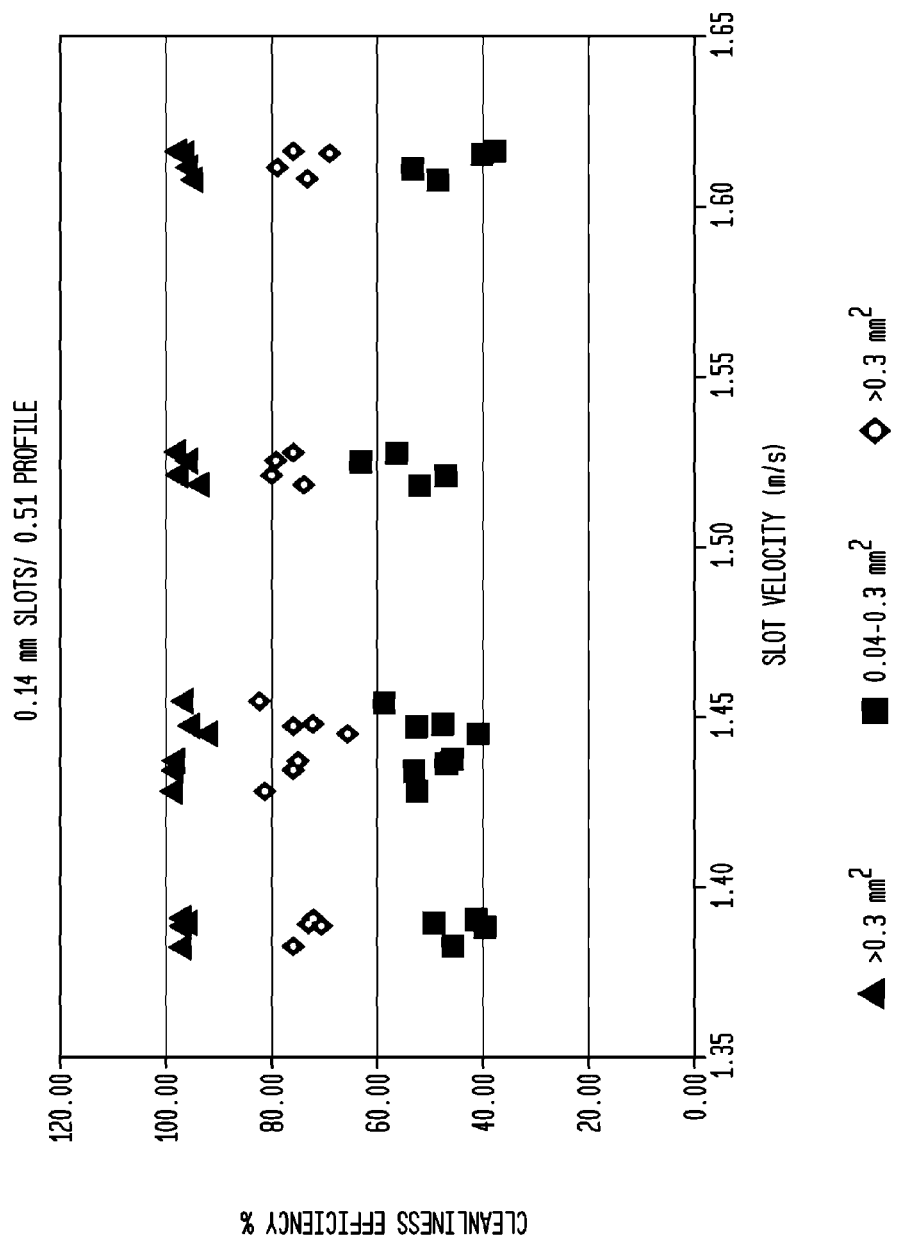

Table 10 presents the results obtained on another screen, V-3 not of the invention, while those results are presented graphically in FIG. 22. While the results are somewhat consistent with slot velocity, it can be appreciated from FIG. 22, that the efficiency of Screen V-3 is inferior to screens of the present invention.

TABLE 10

Screen Basket V-3 - Slot Width 0.16 mm/Profile Height 0.67 mm

| Slot Velocity | Cleanliness Efficiencies (%) Stickies Area Size Ranges | | |
|---|---|---|---|
| (m/s) | >0.04 mm² | 0.04-0.3 mm² | >0.3 mm² |
| 1.53 | 79.1 | 63.3 | 96.0 |
| 1.52 | 80.0 | 47.1 | 98.0 |
| 1.52 | 74.0 | 52.1 | 93.9 |
| 1.53 | 75.9 | 56.4 | 98.0 |
| 1.45 | 82.3 | 58.9 | 96.9 |
| 1.45 | 75.7 | 52.6 | 96.1 |

TABLE 10-continued

Screen Basket V-3 - Slot Width 0.16 mm/Profile Height 0.67 mm

| Slot Velocity | Cleanliness Efficiencies (%) Stickies Area Size Ranges | | |
|---|---|---|---|
| (m/s) | >0.04 mm² | 0.04-0.3 mm² | >0.3 mm² |
| 1.45 | 72.2 | 48.0 | 95.5 |
| 1.45 | 65.7 | 41.2 | 92.5 |
| 1.62 | 75.8 | 38.3 | 97.8 |
| 1.62 | 69.3 | 40.2 | 97.0 |
| 1.61 | 78.8 | 53.4 | 95.9 |
| 1.61 | 73.2 | 48.6 | 95.1 |
| 1.38 | 75.5 | 46.0 | 97.3 |
| 1.39 | 72.2 | 41.6 | 97.1 |
| 1.39 | 73.2 | 49.3 | 96.1 |
| 1.39 | 70.3 | 40.0 | 97.2 |
| 1.44 | 75.2 | 46.0 | 98.8 |
| 1.43 | 81.3 | 52.6 | 99.0 |
| 1.44 | 74.8 | 47.0 | 98.5 |
| 1.43 | 76.0 | 53.3 | 98.7 |
| 1.48 | 75.0 | 48.8 | 96.8 |

EXAMPLE 6 (COMPARATIVE)

Figure 23:
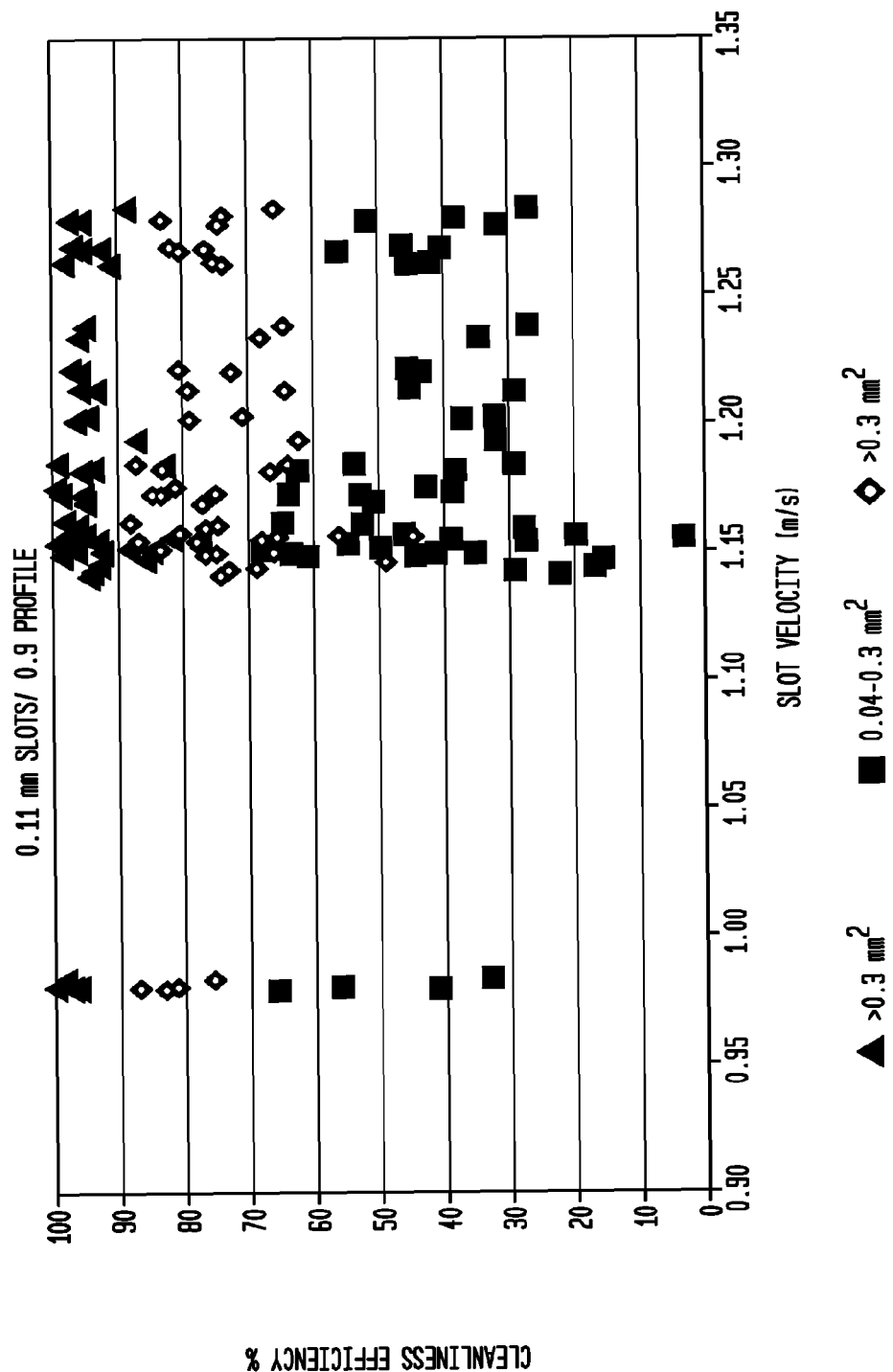

Table 11 presents the results obtained on another screen, A-1 not of the invention, while those results are presented graphically in FIG. 23. It can be appreciated that the results are somewhat inconsistent with slot velocity. It can also be appreciated from FIG. 23, that the efficiency of Screen A-1 is quite low for this type of fiber.

TABLE 11

Screen Basket A-1 - Slot Width 0.11 mm/Profile Height 0.9 mm

| Slot Velocity | Cleanliness Efficiencies (%) Stickies Area Size Ranges | | |
|---|---|---|---|
| (m/s) | >0.04 mm² | 0.04-0.3 mm² | >0.3 mm² |
| 1.16 | 80.4 | 46.1 | 97.3 |
| 1.15 | 77.6 | 39.0 | 96.8 |
| 1.18 | 63.8 | 29.1 | 82.9 |
| 1.19 | 62.2 | 32.0 | 87.1 |
| 1.20 | 78.7 | 37.2 | 96.4 |
| 1.20 | 70.9 | 32.2 | 94.8 |
| 1.15 | 65.7 | 50.0 | 88.2 |
| 1.15 | 87.0 | 54.9 | 99.2 |
| 1.17 | 83.3 | 53.2 | 95.4 |
| 1.17 | 76.8 | 51.0 | 95.0 |
| 1.16 | 75.3 | 52.5 | 96.1 |
| 1.16 | 88.0 | 64.6 | 98.0 |
| 1.15 | 84.6 | 61.1 | 98.7 |
| 1.22 | 80.6 | 45.6 | 97.1 |
| 1.15 | 84.2 | 63.3 | 98.2 |
| 1.15 | 65.9 | 41.3 | 85.2 |
| 1.18 | 83.0 | 62.4 | 93.9 |
| 1.18 | 87.1 | 53.7 | 99.1 |
| 1.28 | 73.8 | 38.2 | 95.4 |
| 1.27 | 80.3 | 56.2 | 95.6 |
| 0.98 | 86.7 | 56.0 | 100.0 |
| 0.98 | 83.0 | 65.7 | 96.5 |
| 0.98 | 81.2 | 41.1 | 97.1 |
| 0.98 | 75.6 | 33.2 | 98.5 |
| 1.15 | 83.8 | 67.7 | 97.7 |
| 1.15 | 75.4 | 44.4 | 96.4 |
| 1.17 | 84.3 | 63.9 | 98.7 |
| 1.18 | 81.3 | 42.7 | 99.4 |
| 1.17 | 74.9 | 38.8 | 98.8 |
| 1.18 | 66.5 | 38.1 | 95.4 |

TABLE 11-continued

Screen Basket A-1 - Slot Width 0.11 mm/Profile Height 0.9 mm

| Slot Velocity | Cleanliness Efficiencies (%) Stickies Area Size Ranges | | |
|---|---|---|---|
| (m/s) | >0.04 mm$^2$ | 0.04-0.3 mm$^2$ | >0.3 mm$^2$ |
| 1.15 | 67.9 | 27.4 | 92.9 |
| 1.16 | 65.7 | 20.0 | 95.4 |
| 1.21 | 64.3 | 29.0 | 93.1 |
| 1.21 | 79.2 | 45.2 | 95.8 |
| 1.14 | 73.1 | 29.2 | 94.1 |
| 1.15 | 48.8 | 15.6 | 85.6 |
| 1.28 | 74.4 | 31.8 | 95.4 |
| 1.26 | 74.9 | 42.0 | 98.0 |
| 1.14 | 68.4 | 17.1 | 93.1 |
| 1.15 | 43.8 | −32.1 | 77.4 |
| 1.24 | 64.7 | 26.9 | 94.8 |
| 1.23 | 68.1 | 34.6 | 95.9 |
| 1.27 | 76.5 | 40.4 | 92.6 |
| 1.27 | 81.7 | 46.2 | 96.6 |
| 1.22 | 72.5 | 43.5 | 96.0 |
| 1.16 | 76.1 | 27.6 | 96.4 |
| 1.14 | 74.1 | 22.4 | 94.4 |
| 1.28 | 83.0 | 51.6 | 97.1 |
| 1.28 | 65.9 | 27.0 | 88.6 |
| 1.26 | 73.8 | 45.5 | 91.1 |
| 1.15 | 76.2 | 35.1 | 92.4 |
| 1.16 | 55.6 | 3.4 | 81.7 |
| 1.17 | 74.4 | 40.1 | 94.4 |

The results of the preceding Examples 1-6 can be summarized in the following set of Tables 12-17 which are graphically represented in FIG. 24.

TABLE 12

Example 1 (Comparative)
Averages from Table 6
Screen Basket V-5 - Slot Width 0.19 mm/Profile Height 0.62 mm

| Slot Velocity | Cleanliness Efficiencies (%) Stickies Area Size Ranges | | |
|---|---|---|---|
| (m/s) | >0.04 mm$^2$ | 0.04-0.3 mm$^2$ | >0.3 mm$^2$ |
| 1.22 | 68.5 | 28.4 | 90.8 |

TABLE 13

Example 2
Averages from Table 7
Screen Basket V-4 - Slot Width 0.14 mm/Profile Height 0.51 mm

| Slot Velocity | Cleanliness Efficiencies (%) Stickies Area Size Ranges | | |
|---|---|---|---|
| (m/s) | >0.04 mm$^2$ | 0.04-0.3 mm$^2$ | >0.3 mm$^2$ |
| 1.72 | 84.6 | 67.3 | 97.7 |

TABLE 14

Example 3
Averages from Table 8
Screen Basket V-2 - Slot width 0.13 mm/Profile Height 0.5 mm

| Slot velocity | Cleanliness Efficiencies (%) Stickies Area Size Ranges | | |
|---|---|---|---|
| (m/s) | >0.04 mm$^2$ | 0.04-0.3 mm$^2$ | >0.3 mm$^2$ |
| 1.40 | 85.1 | 59.4 | 97.4 |

TABLE 15

Example 4 (Comparative)
Averages from Table 9
Screen Basket V-1 - Slot Width 0.11 mm/Profile Height 0.7 mm

| Slot Velocity | Cleanliness Efficiencies (%) Stickies Area Size Ranges | | |
|---|---|---|---|
| (m/s) | >0.04 mm$^2$ | 0.04-0.3 mm$^2$ | >0.3 mm$^2$ |
| 1.38 | 81.6 | 50.1 | 96.3 |

TABLE 16

Example 5 (Comparative)
Averages from Table 10
Screen Basket V-3 - Slot Width 0.16 mm/Profile Height 0.67 mm

| Slot Velocity | Cleanliness Efficiencies (%) Stickies Area Size Ranges | | |
|---|---|---|---|
| (m/s) | >0.04 mm$^2$ | 0.04-0.3 mm$^2$ | >0.3 mm$^2$ |
| 1.48 | 75.0 | 48.8 | 96.8 |

TABLE 17

Example 6 (Comparative)
Averages from Table 11
Screen Basket A-1 - Slot width 0.11 mm/Profile Height 0.9 mm

| Slot velocity | Cleanliness Efficiencies (%) Stickies Area Size Ranges | | |
|---|---|---|---|
| (m/s) | >0.04 mm$^2$ | 0.04-0.3 mm$^2$ | >0.3 mm$^2$ |
| 1.17 | 74.4 | 40.1 | 94.4 |

It can be appreciated from Tables 12-17 and FIG. 24 that the cleanliness efficiencies for stickies are quite sensitive to even small variations in slot width and profile height.

While the invention has been described in connection with several examples, modifications to those examples within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary.

What is claimed is:

1. A metallic screen basket for screening of stickies containing recycled fibers, having a supply side surface approximating that of a right circular cylinder having an axis "A", a circumference "C" and a diameter "D", said surface comprising a plurality of sequences of facets, each sequence comprising a generally circumferentially extending facet, an upstream generally diametrally extending facet adjacent thereto, and a downstream generally diametrally extending facet adjacent thereto, each said generally circumferential facet being generally parallel to the axis "A" of the cylinder and having a leading edge and a trailing edge, each said leading edge and trailing edge as well as each said upstream generally diametrally extending facet and each said downstream generally diametrally extending facet being generally parallel to the axis "A" of the cylinder, each said leading edge being located upon a cylindrical surface S1, and each said trailing edge being located upon a cylindrical surface S2, the diametral difference "d" between the distance from the axis "A" to the cylindrical surface S1 and the diametral distance from the axis "A" to the cylindrical surface S2 being between about 0.35 mm to about 0.60 mm, the normal direction to the surface of each said generally circumferential facet in each sequence of facets having a component directed toward the adjacent trailing edge of an adjacent generally circumferential facet in an adjacent sequence of facets , the angle "a" between the normal to each said generally circumferential facet and the diametral direction of said right circular cylinder being between about 80° and 76°, the distance "t" from the leading edge to the trailing edge of each said generally circumferential facet being between about 2.30 mm and 2.5 mm, the upstream generally diametrally extending facet of each sequence adjoining the leading edge of a generally circumferential facet and the downstream generally diametrally extending facet of each sequence adjoining the trailing edge, the distance between the upstream generally diametrally extending facet of each sequence and the downstream generally diametrally extending facet of the next adjacent sequence being between about 0.11 mm and 0.145 mm, a channel leading from the supply side to the accepts side of said screen being defined between the upstream generally diametrally extending facet of each sequence and the downstream generally diametrally extending facet of the next adjacent sequence.

2. The metallic screen basket of claim 1, wherein the screen basket is comprised of a plurality of metallic faceted vanes.

3. The metallic screen basket of claim 1, wherein the screen basket is formed from at least one unitary metallic sheet, each sheet having a plurality of trenches formed into its surfaces and a plurality of slits formed therethrough.

4. The metallic screen basket of any of claims 1 to 3 wherein the screen basket comprises stainless steel.

5. The metallic screen basket of any of claims 1 to 3 wherein a corrosion resistant hardened surface is disposed upon the screen basket.

6. The metallic screen basket of claim 1 wherein the screen basket is plated with chromium.

7. The metallic screen basket of claim 6 wherein the screen basket bears a hard plating comprising a major proportion of chromium having hardness of at least about 65 on the Rockwell C scale in a thickness of at least 0.2 mils up to about 1.0 mils.

8. An improved screen for separating a supply stream comprising an aqueous dispersion of papermaking fibers contaminated with adhesives into an accepts stream enriched in fibers and depleted in adhesive relative to said supply stream and a rejects stream enriched in adhesive and depleted in fiber relative to said supply stream, said screen comprising: a housing; a generally cylindrical screen basket disposed within said housing, defining an accepts region exterior to said screen basket; a supply duct issuing into said screen basket within said housing; an accepts duct leading from accepts region in said housing; and a rejects duct adapted to receive aqueous dispersion not passing through said screen basket; wherein the improvement comprises; said screen basket comprising a plurality of metallic faceted vanes defining an interior supply side surface approximating that of a right circular cylinder having an axis "A", a circumference "C" and a diameter "D", each vane having formed therein: a generally circumferentially extending facet, an upstream generally diametrally extending facet adjacent thereto, and a downstream generally diametrally extending facet adjacent thereto, each said generally circumferential facet being generally parallel to the axis "A" of the cylinder and having a leading edge and a trailing edge, each said leading edge and trailing edge as well as each said upstream generally diametrally extending facet and each said downstream generally diametrally extending facet being generally parallel to the axis "A" of the cylinder, each said leading edge being located upon an imaginary cylindrical surface S1 generally coaxial with said screen basket, and each said trailing edge being located upon another imaginary cylindrical surface S2 generally coaxial with said screen basket, the diametral difference "d" between the distance from the axis "A" to the cylindrical surface S1 and the diametral distance from the axis "A" to the cylindrical surface S2 being between about 0.35 mm to about 0.60 mm, the normal direction to the surface of each said generally circumferential facet on each vane having a component directed toward the adjacent trailing edge of an adjacent generally circumferential facet in an adjacent vane , the angle "α" between the normal to each said generally circumferential facet and the diametral direction of said right circular cylinder being between about 80° and 76°, the distance "t" from the leading edge to the trailing edge of each said generally circumferential facet being between about 2.30 mm and 2.5 mm, the upstream generally diametrally extending facet of each vane adjoining the leading edge of a generally circumferential facet and the downstream generally diametrally extending facet of each vane adjoining the trailing edge, the distance between the upstream generally diametrally extending facet of each vane and the downstream generally diametrally extending facet of the next adjacent vane being between about 0.11 mm and 0.145 mm, a relieved channel leading from the supply side to the accepts side of said screen being defined between the upstream generally diametrally extending facet of each vane and the downstream generally diametrally extending facet of the next adjacent vane.

9. The improved screen of claim 8, wherein the screen is comprised of a plurality of metallic faceted vanes.

10. The improved screen of claim 8, wherein the screen is formed from at least one unitary metallic sheet, each sheet having a plurality of trenches formed into its surfaces and a plurality of slits formed therethrough.

11. The improved screen of any of claims 8 to 10 wherein the screen comprises stainless steel.

12. The improved screen of any of claims 8 to 10 wherein a corrosion resistant hardened surface is disposed upon the screen.

13. The improved screen of any of claims 8 to 10 wherein the screen is plated with chromium.

14. The improved screen of claim 8 wherein the screen bears a hard plating comprising a major proportion of chromium having hardness of at least about 65 on the Rockwell C scale in a thickness of at least 0.2 mils up to about 1.0 mils.

* * * * *